United States Patent
Takeuchi

(10) Patent No.: US 8,514,290 B2
(45) Date of Patent: Aug. 20, 2013

(54) CAMERA-SHAKE CORRECTION APPARATUS AND IMAGING APPARATUS INCLUDING THE SAME

(75) Inventor: Kenji Takeuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 395 days.

(21) Appl. No.: 12/625,425

(22) Filed: Nov. 24, 2009

(65) Prior Publication Data

US 2010/0134639 A1 Jun. 3, 2010

(30) Foreign Application Priority Data

Nov. 28, 2008 (JP) ................................. 2008-304596
Oct. 30, 2009 (JP) ................................. 2009-250644

(51) Int. Cl.
*H04N 5/228* (2006.01)
*H04N 5/225* (2006.01)
*G06K 9/36* (2006.01)
*G06K 9/32* (2006.01)
*G06K 9/00* (2006.01)
*G03B 17/00* (2006.01)

(52) U.S. Cl.
USPC .............. 348/208.4; 348/208.99; 348/208.13; 348/208.16; 348/169; 382/236; 382/299; 382/107; 382/172; 396/52; 396/55

(58) Field of Classification Search
USPC ................. 348/208.99, 204.4, 208.13, 208.2, 348/208.7, 208.16, 208.3, 208.4, 169, 170; 396/52, 55, 421; 382/172, 107, 236, 154, 382/254, 299
See application file for complete search history.

(56) References Cited

U.S. PATENT DOCUMENTS

| 6,687,458 | B2 * | 2/2004 | Masuda | 396/55 |
| 2004/0052513 | A1 * | 3/2004 | Ohkawara et al. | 396/55 |
| 2004/0090532 | A1 * | 5/2004 | Imada | 348/208.12 |

FOREIGN PATENT DOCUMENTS

JP    11-038461    2/1999

* cited by examiner

*Primary Examiner* — Nhan T Tran
*Assistant Examiner* — Marly Camargo
(74) *Attorney, Agent, or Firm* — Carter, DeLuca, Farrell & Schmidt LLP

(57) ABSTRACT

A camera-shake correction apparatus includes an image capturing unit configured to capture an object image, a camera-shake detection unit configured to detect a camera-shake applied to the camera-shake correction apparatus, a correction unit configured to correct the camera-shake of the object image by moving a correction member based on a camera-shake signal detected by the camera-shake detection unit, and a control unit configured to measure an amplitude of the camera-shake or a frequency of the camera-shake, or both the amplitude of the camera-shake and the frequency of the camera-shake, based on the camera-shake signal supplied from the camera-shake detection unit, and the control unit further configured to control to hold the correction member at a latest position if it is determined that the measured amplitude is smaller than a predetermined amplitude or if it is determined that the measured frequency is lower than a predetermined frequency, or if it is determined that the measured amplitude is smaller than the predetermined amplitude and the measured frequency is lower than the predetermined frequency.

18 Claims, 16 Drawing Sheets

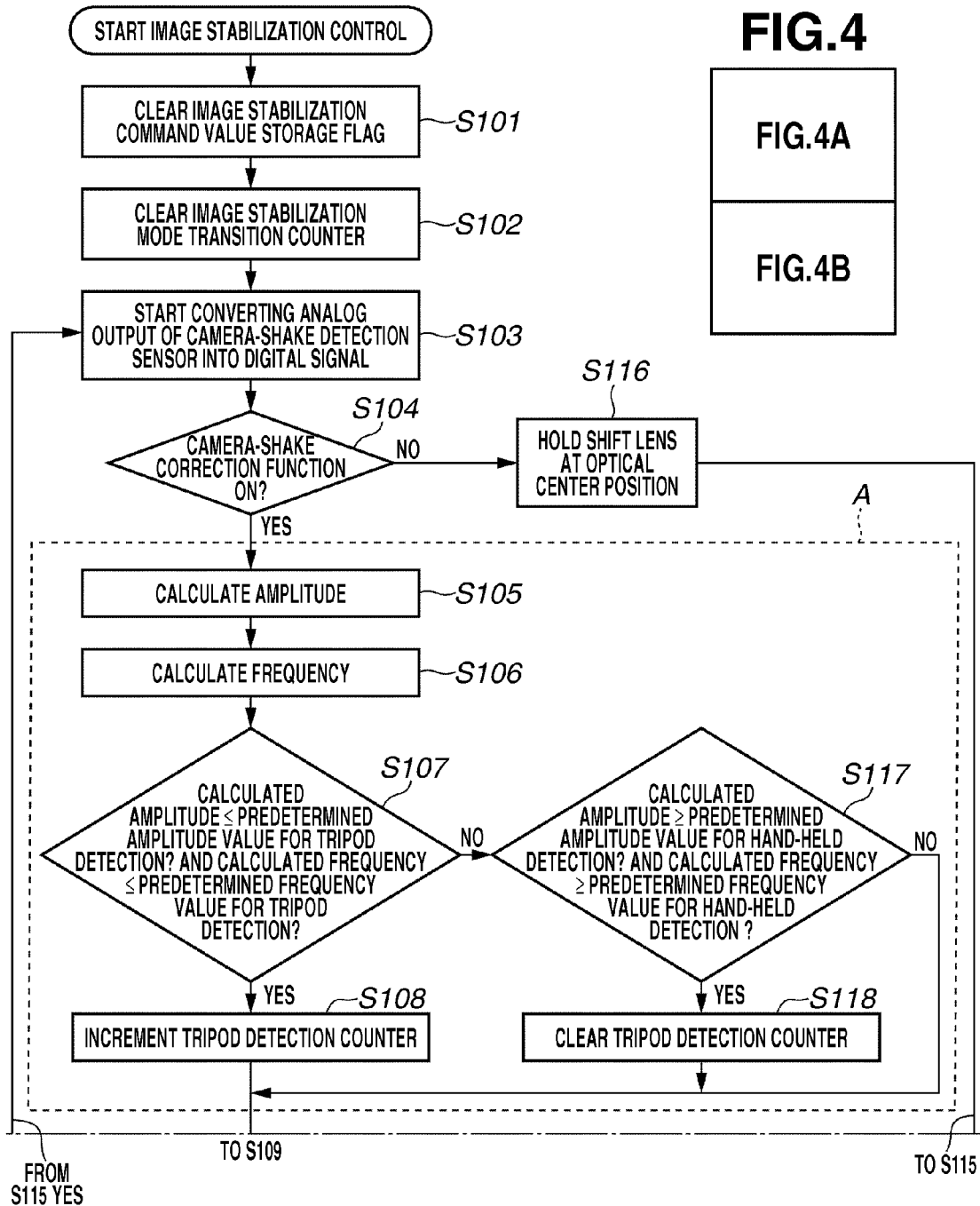

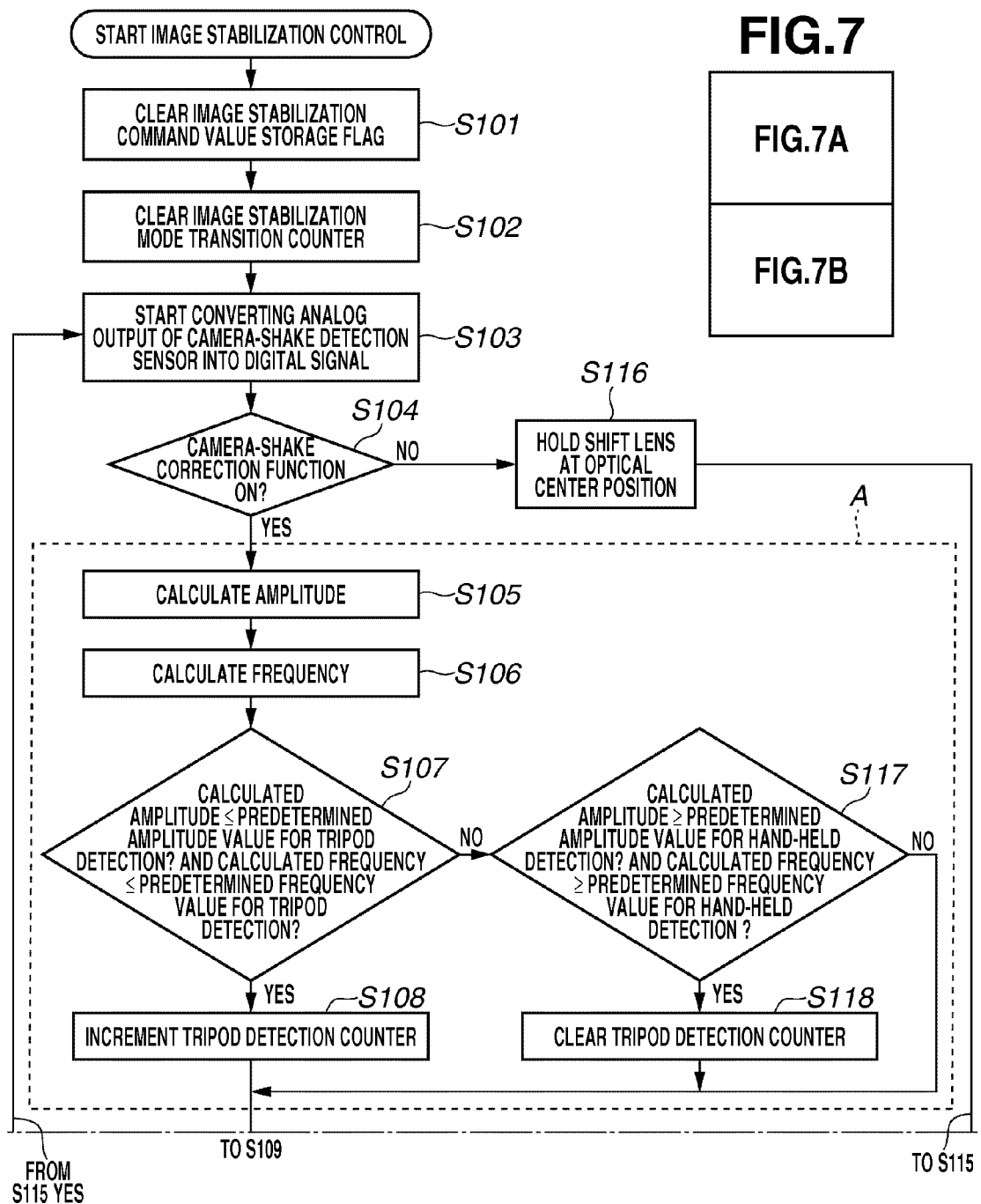

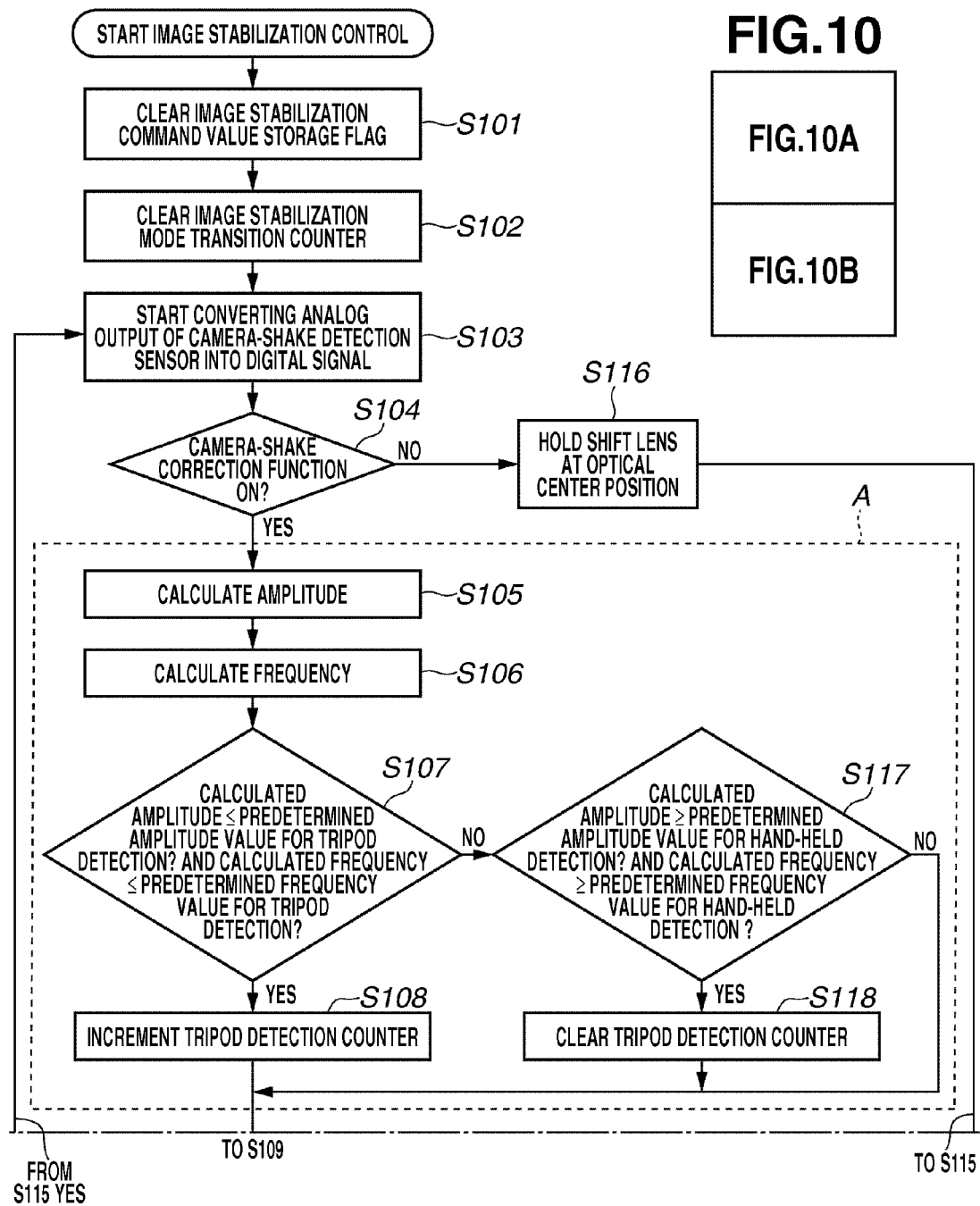

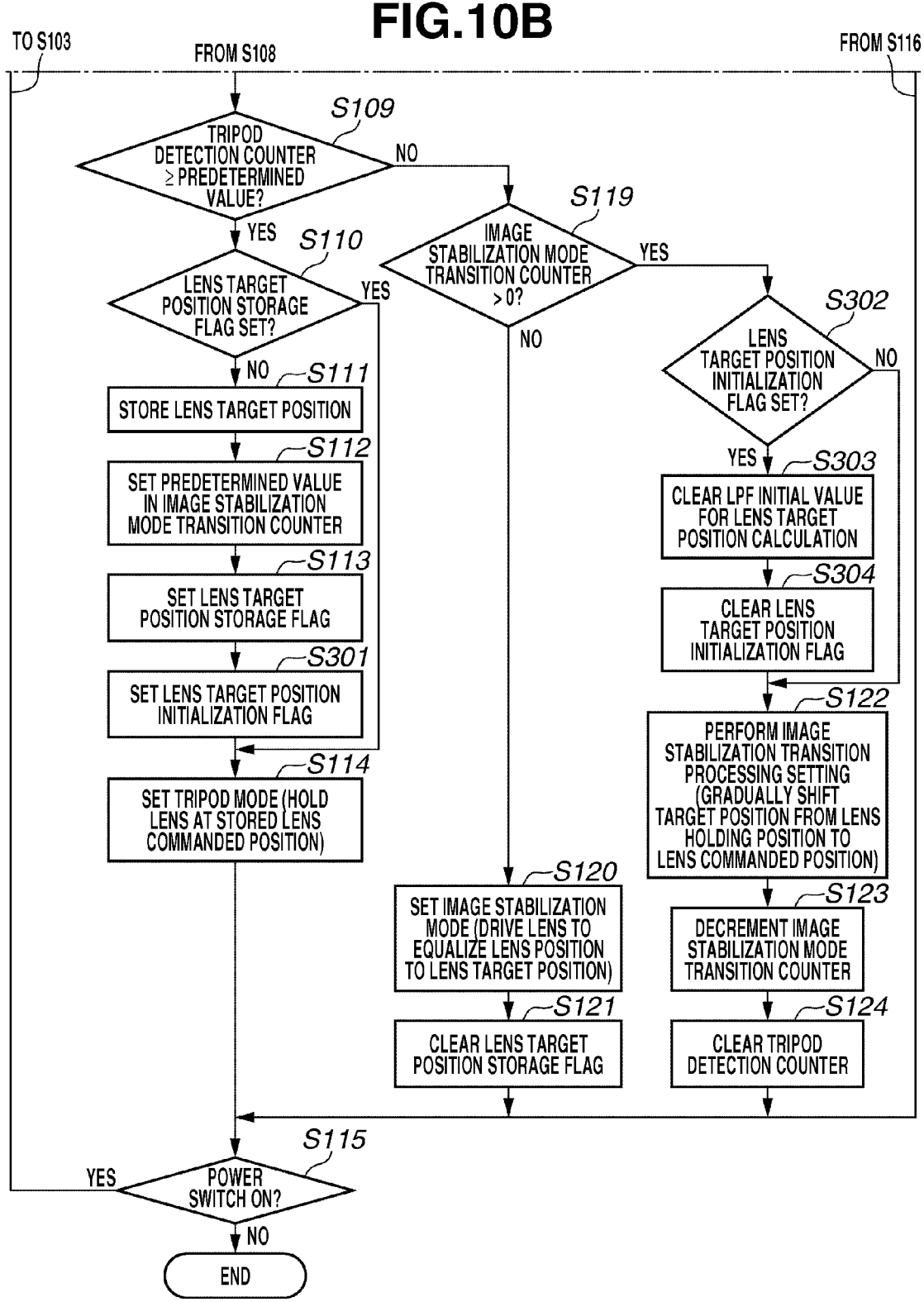

CAMERA-SHAKE CORRECTION APPARATUS AND IMAGING APPARATUS INCLUDING THE SAME

BACKGROUND OF THE INVENTION

1. Field of the Invention

The present invention relates to a camera-shake correction apparatus and an imaging apparatus including the camera-shake correction apparatus.

2. Description of the Related Art

A camera-shake correction apparatus or an imaging apparatus having a camera-shake correction function can be equipped with a gyro sensor (i.e., an angular speed sensor) to detect a camera-shake amount applied to the apparatus. The gyro sensor includes a piezoelectric element or a comparable vibratory member that vibrates at a predetermined frequency. The gyro sensor can convert a Coriolis force into a voltage to obtain angular speed information. Then, the gyro sensor integrates the obtained angular speed to calculate the camera-shake amount. The camera-shake correction can be performed by moving a camera-shake correction member (e.g., a shift lens or an image sensor) that can optically shift the angle of view in a predetermined direction so as to cancel the calculated camera-shake amount.

In such a camera-shake correction apparatus, to adequately correct vibrations that may be caused by a shaking hand or other vibrations having similar frequency distributions, a suitable camera-shake detection sensor is required and a camera-shake correction optical system needs to be adequately selected. Further, it is required to adequately set a response frequency band for the above-described sensor. Similarly, it is required to adequately set a response frequency band for a driving mechanism.

Accordingly, in a case where the above-described camera-shake correction apparatus is fixed on a tripod, the camera-shake correction member may unnecessarily perform a camera-shake correction in response to a low-frequency drift signal (i.e., fluctuation) that may be output from the camera-shake detection sensor. The low-frequency drift signal has no relationship with the shake of the imaging apparatus. In this case, the fluctuation of an image formed on the image sensor may rather be increased.

To solve the above-described drawbacks, for example as discussed in Japanese Patent Application Laid-Open No. 11-38461, if the camera-shake detection sensor generates a very small output signal, it can be regarded that the imaging apparatus is fixed or attached to the tripod. Therefore, in this case, execution of the camera-shake correction is cancelled.

The conventional technique requires a vibration detection unit configured to detect a vibration amount applied to the imaging apparatus and a supporting state determination unit configured to determine a supporting state of the imaging apparatus by determining whether the imaging apparatus is held by a user's hand or attached to the tripod. The supporting state determination processing to be performed by the conventional technique includes comparing a camera-shake signal obtained by the vibration detection unit with a predetermined determination level, then updating a count value if the camera-shake signal is equal to or greater than the determination level, or equal to or less than the determination level, and finally identifying the supporting state of the imaging apparatus by determining whether the count value is equal to or greater than a predetermined value.

Further, the conventional technique does not perform a camera-shake correction operation if the camera-shake detection sensor generates a very small output signal before starting exposure processing. This is effective to prevent the camera-shake correction operation from being unnecessarily performed in response to the low-frequency drift signal that may be output from the camera-shake detection sensor in a state where the imaging apparatus (e.g., a camera) or an optical device is fixed to the tripod. In this case, if a camera-shake displacement is small in amplitude, the conventional technique always cancels the camera-shake correction operation and holds the lens at an optical center position.

However, in a state where the camera-shake detection sensor generates a very small output signal after starting the exposure processing, if the camera-shake correction member is moved to the optical center position during the exposure processing, a captured image may be a fluctuated image that includes a change in the angle of view. Further, when the camera-shake correction operation resumes again from a state where the camera-shake correction operation is stopped, the camera-shake correction operation cannot be accurately performed if a lens target position is an edge of a driving range of a camera-shake correction lens.

SUMMARY OF THE INVENTION

The present invention is directed to a camera-shake correction apparatus and an imaging apparatus including the camera-shake correction apparatus. In a state where the camera-shake detection sensor generates a very small output signal after starting the exposure processing, the camera-shake correction apparatus and the imaging apparatus according to the present invention can prevent a change in the angle of view from being captured as a fluctuated image by moving the camera-shake correction member to the optical center position during the exposure processing.

According to an aspect of the present invention, a camera-shake correction apparatus includes an image capturing unit configured to capture an object image, a camera-shake detection unit configured to detect a camera-shake applied to the camera-shake correction apparatus, a correction unit configured to correct the camera-shake of the object image by moving a correction member based on a camera-shake signal detected by the camera-shake detection unit, and a control unit configured to measure an amplitude of the camera-shake or a frequency of the camera-shake, or both the amplitude of the camera-shake and the frequency of the camera-shake, based on the camera-shake signal supplied from the camera-shake detection unit, and the control unit further configured to control to hold the correction member at a latest position if it is determined that the measured amplitude is smaller than a predetermined amplitude or if it is determined that the measured frequency is lower than a predetermined frequency, or if it is determined that the measured amplitude is smaller than the predetermined amplitude and the measured frequency is lower than the predetermined frequency.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 10 (10A and 10B) is a flowchart illustrating an example of an image stabilization control according to the third exemplary embodiment of the present invention.

DESCRIPTION OF THE EMBODIMENTS

Various exemplary embodiments, features, and aspects of the invention will be described in detail below with reference to the drawings.

Figure 1:
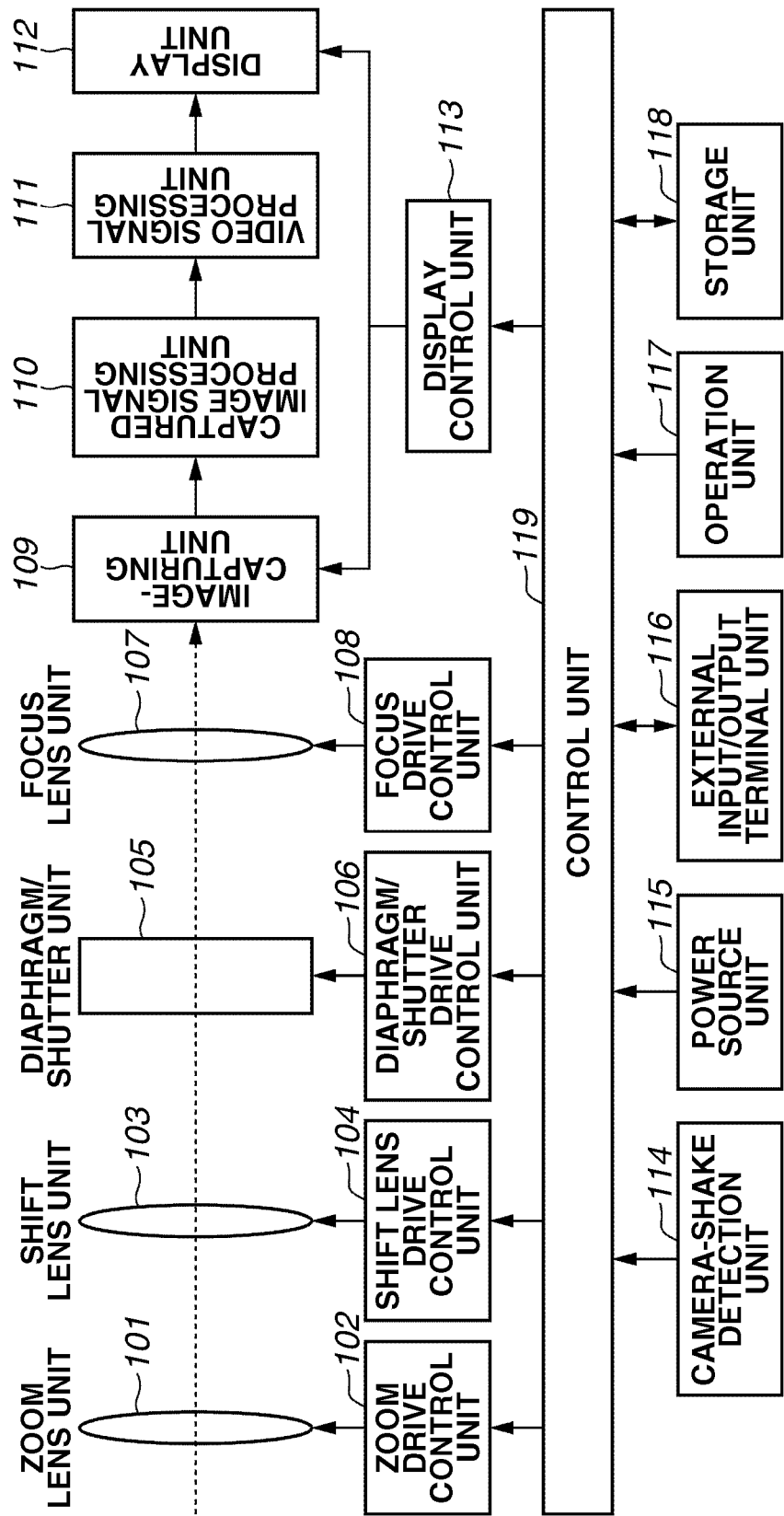
FIG. 1 is a block diagram illustrating an example of an entire configuration of an imaging apparatus according to an exemplary embodiment of the present invention.

A first exemplary embodiment of the present invention is described below. FIG. 1 is a block diagram illustrating an example of a configuration of an imaging apparatus.

In FIG. 1, a zoom lens unit 101 includes a zoom lens that can perform a zooming operation. A zoom drive control unit 102 can drive and control the zoom lens unit 101. A shift lens unit 103 is movable in a direction substantially perpendicular to an optical axis and can serve as a camera-shake correction member that can perform the camera-shake correction. In the present exemplary embodiment, the camera-shake correction member is a shift lens. However, if similar effects are obtainable, the shift lens can be replaced by an image sensor configured to be movable in the direction substantially perpendicular to the optical axis.

A shift lens drive control unit 104 can drive and control the shift lens unit 103 (i.e., the camera-shake correction member). The shift lens drive control unit 104 can further stop electric power to be supplied to the shift lens drive control unit 104 in a power saving mode.

A diaphragm/shutter drive control unit 106 can drive and control a diaphragm/shutter unit 105. A focus lens unit 107 includes a lens that can perform a focus adjustment. A focus drive control unit 108 can drive and control the focus lens unit 107. An image capturing unit 109 includes an image sensor that can convert a light image having passed through lens groups into an electric signal. A captured image signal processing unit 110 can perform processing for converting the electric signal output from the image capturing unit 109 into a video signal.

A video signal processing unit 111 can process and modify the video signal output from the captured image signal processing unit 110 according to various purposes. A display unit 112 can perform an image display, if necessary, based on a signal output from the video signal processing unit 111. A display control unit 113 can control operations and displays to be performed by the image capturing unit 109 and the display unit 112. A camera-shake detection unit 114 can detect a degree of the camera-shake applied to the imaging apparatus.

A power source unit 115 can supply electric power to various components and portions in the system according to their operations. An external input/output terminal unit 116 can input and output communication signals and video signals from and to an external device. An operation unit 117 enables users to operate the system. A storage unit 118 can store various data including video information. A control unit 119 can control the entire system.

Next, operations of the imaging apparatus having the above-described configuration are described below. The operation unit 117 includes a shutter release button configured to successively turn on a first switch (SW1) and a second switch (SW2) when the button is pressed. The first switch is turned on when the shutter release button is pressed by an amount equivalent to an approximately half depth. The second switch is turned on when the shutter release button is fully pressed.

If the first switch of the operation unit 117 is turned on, the focus drive control unit 108 drives the focus lens unit 107 to perform the focus adjustment and the diaphragm/shutter drive control unit 106 drives the diaphragm/shutter unit 105 to set an appropriate exposure amount.

Further, if the second switch is turned on, the control unit 119 instructs a shooting operation. The storage unit 118 stores image data obtained from a light image (i.e., an imaging object image) formed by the image capturing unit 109. In this case, if a camera-shake correction function ON instruction is input via the operation unit 117, the control unit 119 instructs the shift lens drive control unit 104 to perform a camera-shake correction operation. In response to the instruction received from the control unit 119, the shift lens drive control unit 104 performs the camera-shake correction operation until a camera-shake correction function OFF instruction is input.

If the operation unit 117 is not continuously operated for a predetermined time, the control unit 119 outputs an instruction for stopping electric power to be used for the display. In other words, the control unit 119 brings the system into the power saving mode. The imaging apparatus according to the present exemplary embodiment enables users to select its shooting mode between a still image shooting mode and a moving image shooting mode via the operation unit 117. In each mode, users can change operation conditions of each actuator control unit.

If an instruction for causing the zoom lens to perform the zooming operation is input via the operation unit 117, the zoom drive control unit 102 receives the instruction via the control unit 119 and drives the zoom lens unit 101 to move the zoom lens to an instructed zoom position. Meanwhile, the focus drive control unit 108 drives the focus lens unit 107 to perform the focus adjustment based on image information sent from the image capturing unit 109 and processed by respective signal processing units 110 and 111.

Figure 2:
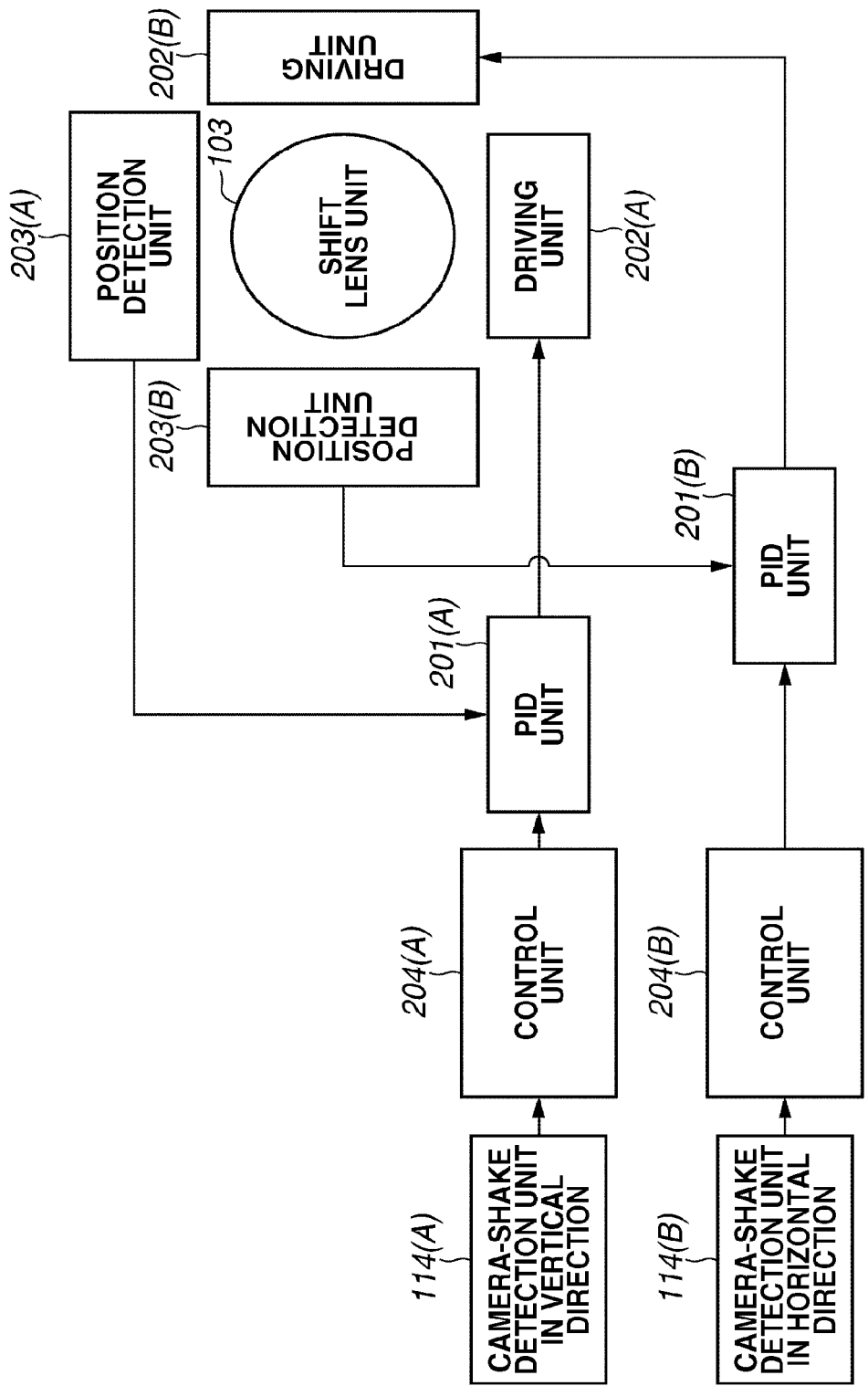
FIG. 2 is a block diagram illustrating an example of a control unit according to an exemplary embodiment of the present invention.

FIG. 2 is a block diagram illustrating an example of an internal configuration of the shift lens drive control unit 104. In FIG. 2, the vertical direction is a pitch direction when the optical axis of the imaging apparatus is set along the Z axis. The horizontal direction is a yaw direction when the optical axis of the imaging apparatus is set along the Z axis.

A camera-shake detection unit 114(A) for the vertical direction can detect a camera-shake amount of the imaging apparatus in the vertical direction when the imaging apparatus is in a normal orientation. A camera-shake detection unit 114(B) for the horizontal direction can detect a camera-shake amount of the imaging apparatus in the horizontal direction when the imaging apparatus is in the normal orientation. A control unit 204(A) for the vertical direction can determine a target position based on a camera-shake correction amount in the vertical direction. A control unit 204(B) for the horizontal direction can determine a target position based on a camera-shake correction amount in the horizontal direction. The control unit 204(A) and the control unit 204(B) can perform a position control for the shift lens unit 103 based on the determined target positions in the vertical direction and the horizontal direction.

A proportional-integral-differential (PID) unit 201(A) can serve as a feedback control unit for the vertical direction. A PID unit 201(B) can serve as a feedback control unit for the horizontal direction. The PID unit 201(A) for the vertical direction can obtain a control amount in the vertical direction based on a deviation between the target position in the vertical direction and an actual position signal indicating the vertical position of the shift lens unit 103 and can output a position command signal in the vertical direction. The PID unit 201(B) for the horizontal direction can obtain a control amount in the horizontal direction based on a deviation between the target position in the horizontal direction and an actual position signal indicating the horizontal position of the shift lens unit 103 and can output a position command signal in the horizontal direction.

A driving unit 202(A) can serve as a driving unit for the vertical direction. A driving unit 202(B) can serve as a driving unit for the horizontal direction. The driving unit 202(A) can drive the shift lens unit 103 in the vertical direction based on the position command signal sent from the PID unit 201(A). The driving unit 202(B) can drive the shift lens unit 103 in the horizontal direction based on the position command signal sent from the PID unit 201(B). A position detection unit 203(A) for the vertical direction, which is for example configured by a hall device, can detect a present position of the shift lens unit 103 in the vertical direction. A position detection unit 203(B) for the horizontal direction, which is for example configured by a hall device, can detect a present position of the shift lens unit 103 in the horizontal direction.

Next, an example of the position control of the shift lens unit 103 to be performed by the shift lens drive control unit 104 is described below.

In the position control, the shift lens drive control unit 104 drives the shift lens unit 103 in respective directions based on the signals representing the camera-shake amounts of the imaging apparatus supplied from the camera-shake detection unit 114(A) for the vertical direction and the camera-shake detection unit 114(B) for the horizontal direction. The shift lens unit 103 is equipped with a magnet. The position detection unit 203(A) for the vertical direction and the position detection unit 203(B) for the horizontal direction can detect a magnetic field of the magnet. The position detection unit 203(A) for the vertical direction sends a position signal indicating the actual position of the shift lens unit 103 for the vertical direction to the PID unit 201(A). The position detection unit 203(B) for the horizontal direction sends a position signal indicating the actual position of the shift lens unit 103 for the horizontal direction to the PID unit 201(A).

The PID unit 201(A) for the vertical direction can perform a feedback control to equalize the position signal with a correction position control signal sent from the control unit 204(A) for the vertical direction. The PID unit 201(B) for the horizontal direction can perform a feedback control to equalize the position signal with a correction position control signal sent from the control unit 204(B) for the horizontal direction. In this case, the PID unit 201(A) for the vertical direction and the PID unit 201(B) for the horizontal direction can selectively combine a proportional control, an integral control, and a differential control to realize a PID control. Thus, the shift lens drive control unit 104 can prevent an image from fluctuating due to a camera-shake that may occur when users operate the imaging apparatus.

Figure 3:
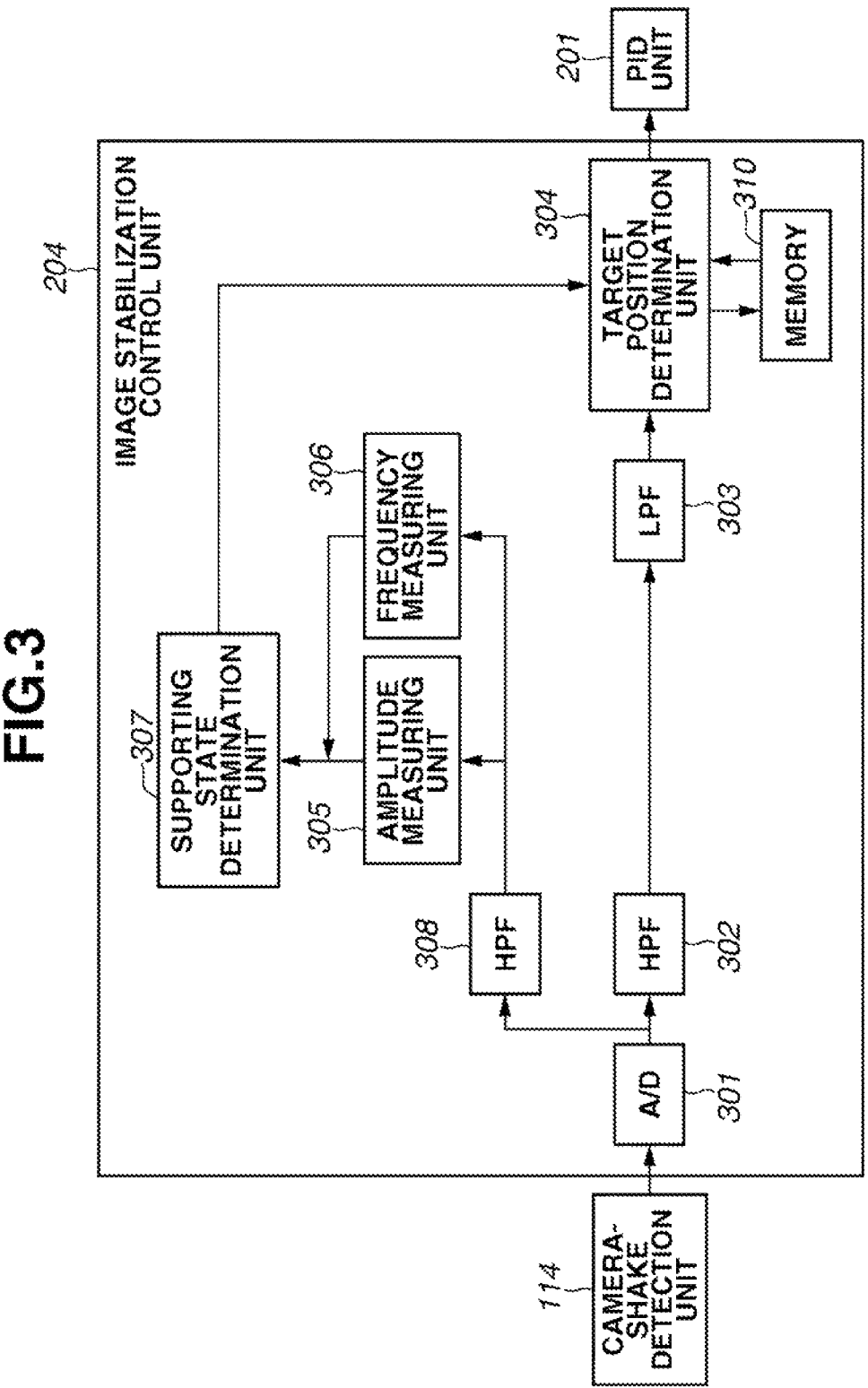
FIG. 3 is a block diagram illustrating an example of a control unit according to a first exemplary embodiment of the present invention.

FIG. 3 is a block diagram illustrating an example of the control unit 204 (i.e., the control unit 204(A) for the vertical direction and the control unit 204(B) for the horizontal direction).

An analog-digital (AD) converter 301 can convert a signal received from an angular speed sensor into a digital signal. A high-pass filter (hereinafter, simply referred to as HPF) 302 can change a cutoff frequency for cutting a DC component and can be used to calculate a lens target position.

A low-pass filter (hereinafter, simply referred to as LPF) 303 can convert an angular speed signal into an angular signal. An HPF 308 serves as an additional HPF that is independent of the HPF 302 and capable of setting the cutoff frequency for cutting a specific frequency component included in an output signal of the A/D converter 301. The HPF 308 can be used to determine a supporting state as described below.

An amplitude measuring unit 305 can measure an amplitude amount applied to the imaging apparatus based on the angular speed signal from which the DC component has been removed by the HPF 308. A frequency measuring unit 306 can measure a frequency applied to the imaging apparatus. A supporting state determination unit 307 can perform supporting state determination based on the amplitude amount calculated by the amplitude measuring unit 305 and the frequency calculated by the frequency measuring unit 306. More specifically, the supporting state determination unit 307 can determine whether the imaging apparatus is attached to a tripod (or a comparable supporting device) or held by a user's hand.

If the supporting state determination unit 307 determines that the imaging apparatus is attached to the tripod or the like, the control unit 204 changes the cutoff frequency of the HPF 302. Further, the control unit 204 changes a control method for a target position determination unit 304 that determines a target position of a correction lens, using the memory 310 that stores the target position. The angular speed signal having been input in the control unit 204, after having been subjected to the above-described sequential processing, is output as a correction position control signal to the PID unit 201.

An operation to be performed by the camera-shake correction apparatus having the above-described configuration according to the present exemplary embodiment is described below with reference to a flowchart illustrated in FIG. 4.

First, the camera-shake correction apparatus starts an image stabilization control operation when a power source of the imaging apparatus is turned on. For example, a software program can execute the image stabilization control operation in both the pitch direction (i.e., a first direction) and the yaw direction (i.e., a second direction) in response to each interrupt processing to be generated at predetermined intervals (e.g., 125 ms). In steps S101 and S102, the camera-shake correction apparatus performs initial operations.

In the present exemplary embodiment, in step S101, the camera-shake correction apparatus clears an image stabilization command value storage flag that can be used in an image stabilization control to be performed by the target position determination unit 304. Similarly, in step S102, the camera-shake correction apparatus clears an image stabilization mode transition counter that is used by the target position determination unit 304.

If an interrupt in the control is generated at the predetermined intervals (e.g., 125 ms), then in step S103, the A/D converter 301 starts converting an analog output of a camera-shake detection sensor into a digital signal. Next, in step S104, the control unit 119 determines whether the camera-shake correction function is ON. If the control unit 119 determines that the camera-shake correction function is ON (YES in step S104), the processing proceeds to step S105. On the other hand, if the control unit 119 determines that the camera-shake correction function is OFF (NO in step S104), the processing proceeds to step S116.

In step S116, i.e., when the camera-shake correction function is OFF, the control unit 204 stationarily holds a camera-shake correction lens at an optical center position. Then, the processing proceeds to step S115. In step S115, it is determined whether the power source switch is in an ON state. If it is determined that the power source switch is in the ON state (YES in step S115), the processing returns to step S103. More specifically, in the next control interrupt processing, the A/D converter 301 converts an analog output of the camera-shake detection sensor into a digital signal (see step S103) and the control unit 119 determines whether the camera-shake correction function is ON (see step S104). If it is determined that the power source switch is in an OFF state (NO in step S115), the camera-shake correction apparatus stops the image stabilization control.

In step S105, the amplitude measuring unit 305 calculates the amplitude of a camera-shake signal that represents the camera-shake amount applied to the imaging apparatus. In this calculation, the amplitude measuring unit 305 uses a signal obtained by the HPF 308 that removes the DC component from the A/D converted camera-shake signal. Next, in step S106, the frequency measuring unit 306 calculates a frequency of the camera-shake signal. In FIG. 3, each of the HPF 302 and the HPF 308 performs for cutting a specific frequency component included in an output signal of the A/D converter 301. The HPF 302 and the HPF 308 can be used to independently set a signal band for determining a supporting state of the imaging apparatus and a signal band used for a camera-shake correction control.

Next, in step S107, the supporting state determination unit 307 compares the calculated amplitude with a predetermined amplitude value for a tripod detection. In the present exemplary embodiment, the predetermined amplitude value for the tripod detection is a threshold for detecting a state where the imaging apparatus is attached to the tripod. The supporting state determination unit 307 further compares the calculated frequency with a predetermined frequency value for the tripod detection. In the present exemplary embodiment, the predetermined frequency value for the tripod detection is a threshold for detecting a state where the imaging apparatus is attached to the tripod.

If it is determined that the calculated amplitude is smaller than the predetermined amplitude value for the tripod detection and the calculated frequency is lower than the predetermined frequency value for the tripod detection (YES in step S107), the processing proceeds to step S108. In step S108, the supporting state determination unit 307 increments a tripod detection counter. Then, the processing proceeds to step S109. On the other hand, if it is determined that at least one of the amplitude and the frequency calculated by the supporting state determination unit 307 is not smaller than the predetermined amplitude value for the tripod detection or not lower than the predetermined frequency value for the tripod detection (NO in step S107), the processing proceeds to step S117.

In step S117, the supporting state determination unit 307 determines whether the imaging apparatus is in a hand-held state using a threshold for hand-held detection (i.e., a second amplitude or a second frequency) that is set separately from the threshold for the tripod detection. More specifically, the supporting state determination unit 307 compares the calculated amplitude with a predetermined amplitude value for the hand-held detection and further compares the calculated frequency with a predetermined frequency value for the hand-held detection. If it is determined that the calculated amplitude is greater than the predetermined amplitude value for the hand-held detection and the calculated frequency is higher than the predetermined frequency value for the hand-held detection (YES in step S117), the processing proceeds to step S118.

Then, in step S118, the supporting state determination unit 307 clears the tripod detection counter. Then, the processing proceeds to step S109. If it is determined that at least one of the calculated amplitude and the calculated frequency is not greater than the predetermined amplitude value for the hand-held detection or is not higher than the predetermined frequency value for the hand-held detection (NO in step S117), the processing directly proceeds to step S109.

In the present exemplary embodiment, the predetermined amplitude value for the tripod detection to be used in the processing of step S107 is different from the predetermined amplitude value for the hand-held detection to be used in the processing of step S117. The predetermined frequency value for the tripod detection to be used in the processing of step S107 is different from the predetermined frequency value for the hand-held detection to be used in the processing of step S117. However, as another version of the present exemplary embodiment, the predetermined amplitude value for the tripod detection can be set to be similar or identical to the predetermined amplitude value for the hand-held detection. Further, the predetermined frequency value for the tripod detection can be set to be similar or identical to the predetermined frequency value for the hand-held detection.

As described above, in a case where the predetermined amplitude value for the tripod detection is different from the predetermined amplitude value for the hand-held detection and further the predetermined frequency value for the tripod detection is different from the predetermined frequency value for the hand-held detection, the present exemplary embodiment sets the predetermined amplitude value for the hand-held detection to be greater than the predetermined amplitude value for the tripod detection and further sets the predetermined frequency value for the hand-held detection to be higher than the predetermined frequency value for the tripod detection. This is because a camera-shake amount applied to the imaging apparatus in a state where the imaging apparatus is in the hand-held state is larger than a camera-shake amount applied to the imaging apparatus in a tripod supported state.

In step S109, the supporting state determination unit 307 compares a tripod detection counter value with a predetermined counter value for the tripod detection. If the tripod detection counter value is equal to or greater than the predetermined counter value for the tripod detection, the supporting state determination unit 307 determines that the imaging apparatus is in the tripod supported state (YES in step S109), because this is a state where the imaging apparatus is continuously subjected to vibrations having smaller amplitudes and lower frequencies for a significant time. Then, the processing proceeds to step S110.

The following processing is referred to as a tripod mode that is one of the camera-shake correction functions. First, in step S110, the supporting state determination unit 307 determines whether a lens target position storage flag is set. If it is determined that the lens target position storage flag is not set (NO in step S110), the processing proceeds to step S111. If the supporting state determination unit 307 determines that the lens target position storage flag is set (YES in step S110), the processing directly proceeds to step S114.

In step S111, the supporting state determination unit 307 stores the lens target position output from the LPF 303 in the memory 310. The lens target position storage flag is used to store the latest lens target position in the control interrupt to be performed immediately after a transition to the tripod mode.

Next, in step S112, the supporting state determination unit 307 sets a predetermined value in the image stabilization mode transition counter. Then, in step S113, the supporting state determination unit 307 sets the lens target position storage flag. Subsequently, the processing proceeds to step S114. In step S114, the supporting state determination unit 307 sets the tripod mode. In this case, the supporting state determination unit 307 sets the target position of the camera-shake correction lens to be equal to an image stabilization command value stored in the memory.

In step S115, the control unit 119 determines whether the power source switch is in the ON state. If the control unit 119 determines that the power source switch is in the ON state (YES in step S115), the processing returns to step S103. The camera-shake correction apparatus performs processing similar to the above-described processing in the next control interrupt processing. In step S109, the camera-shake correction apparatus again confirms whether the condition for the tripod mode is met.

If the condition is met, i.e., when the tripod detection counter value is equal to or greater than the predetermined counter value for the tripod detection (YES in step S109), the camera-shake correction apparatus determines that the lens target position storage flag has been set in step S113 of the preceding interrupt processing. Therefore, the camera-shake correction apparatus does not update the lens target position stored in step S111.

Figure 5A:
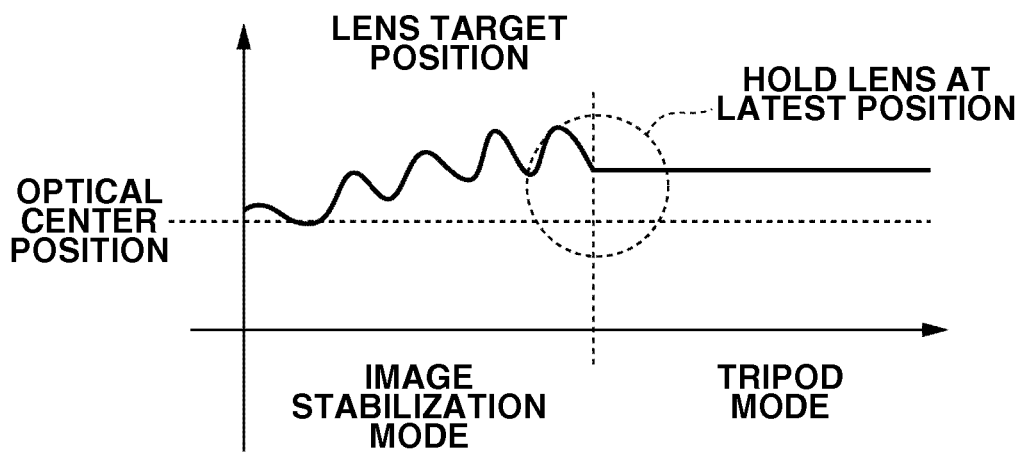
FIGS. 5A and 5B illustrate examples of a correction position control signal according to the first exemplary embodiment of the present invention.

Accordingly, the camera-shake correction apparatus sets the target position of the camera-shake correction lens to be equal to the image stabilization command value stored in the memory 310 (see step S111), similar to the previous interrupt processing. Through the above-described processing, the camera-shake correction apparatus continuously holds the camera-shake correction lens at a position corresponding to the image stabilization command value in the initial interrupt processing in which the tripod mode was set (see a waveform example illustrated in FIG. 5A).

On the other hand, if the tripod detection counter value is less than the predetermined counter value for the tripod detection (NO in step S109), the processing proceeds to step 119. In this case, the camera-shake correction apparatus determines that the imaging apparatus is in the hand-held state. The camera-shake correction apparatus shifts the operation mode to an image stabilization mode for performing a camera-shake correction.

When the camera-shake correction apparatus shifts the operation mode from the tripod mode to the image stabilization mode, a lens holding position may be greatly different from an inherent lens target position depending on a relationship between them. In such a case, the command value causes a stepwise change in the interrupt processing starting immediately after the operation mode has shifted from the tripod mode to the image stabilization mode. Therefore, the angle of view may greatly change between captured images. Accordingly, the captured image may be an unnatural image that is not intended by a photographer.

Figure 5B:
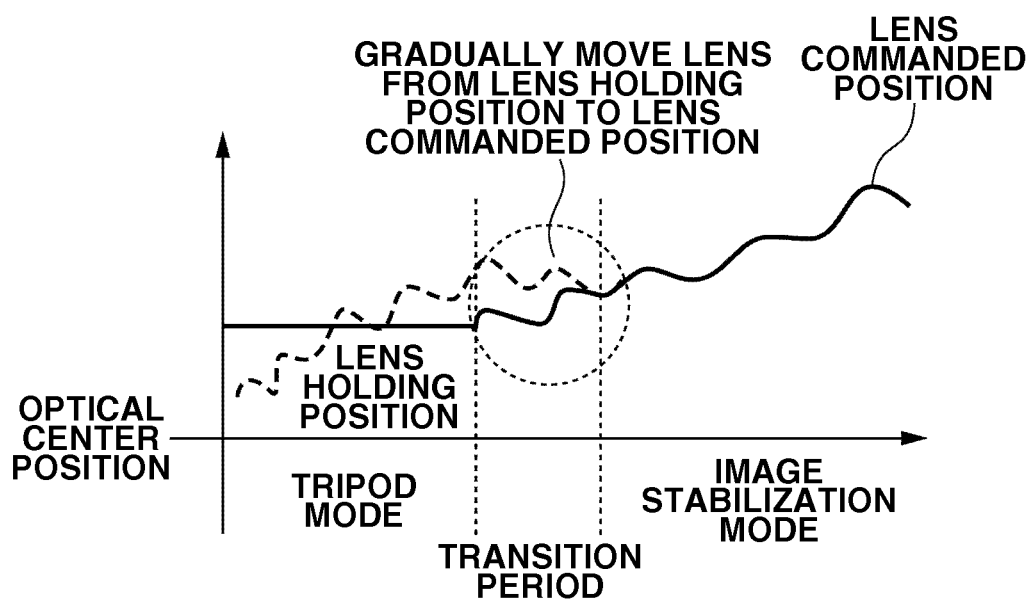

Therefore, as illustrated in FIG. 5B, the present exemplary embodiment provides a transition period during which the operation mode gradually shifts from the tripod mode to the image stabilization mode. To this end, the target position determination unit 304 performs processing of steps S119 to S123. In other words, the target position determination unit 304 performs processing for gradually reducing the different between the lens holding position and the lens target position for a relatively long time during which the interrupt processing is performed several times. Accordingly, the target position determination unit 304 can prevent the angle of view from abruptly changing.

In step S119, the target position determination unit 304 determines whether the image stabilization mode transition counter is greater than zero. For example, in a case where the operation mode is shifted to the tripod mode, a predetermined value is already set in the image stabilization mode transition counter. Therefore, in this case, the target position determination unit 304 determines that the image stabilization mode transition counter is greater than zero (YES in step S119), and the processing proceeds to step S122. In step S122, the target position determination unit 304 performs image stabilization transition processing setting.

In step S122, the target position determination unit 304 calculates a difference between a lens holding value in the tripod mode and the image stabilization command value in the image stabilization mode in each interrupt sampling. Then, to gradually reduce the difference between the lens holding position and the lens target position for a relatively long time during which the interrupt processing is performed several times, the target position determination unit 304 gradually increases the command value so that the lens position can be equalized with the lens target position during a period of time corresponding to a processing counter value after starting the image stabilization mode.

Then, in step S123, the target position determination unit 304 decrements the image stabilization mode transition counter. Then, in step S124, the supporting state determination unit 307 clears the tripod detection counter.

The reason why the tripod detection counter is cleared in step S124 is that the tripod detection counter may satisfy the condition of step S109 in a transitional phase from the tripod mode to the image stabilization mode. In this case, the operation mode again returns to the tripod mode. To eliminate such a drawback, the supporting state determination unit 307 clears the tripod detection counter. After the image stabilization mode transition counter is decremented in step S123, the image stabilization mode transition counter finally becomes zero.

If it is determined that the image stabilization mode transition counter is equal to zero (NO in step S119), then in step S120, the supporting state determination unit 307 drives the lens to shift the lens position to the lens target position. Then, the processing proceeds to step S121.

In step S121, to continuously perform an image stabilization function in the normal image stabilization mode until the condition of the tripod mode is satisfied again, the supporting state determination unit 307 clears the lens target position storage flag for the next transition to the tripod mode. Then, the processing proceeds to step S115 to perform normal image stabilization mode setting.

According to the above-described exemplary embodiment, in a state where the imaging apparatus is stationarily attached to the tripod, the camera-shake correction apparatus checks the signal output from the camera-shake detection sensor to determine whether the camera-shake correction is required. Then, if it is determined that the camera-shake correction is not required, the camera-shake correction apparatus stationarily holds the camera-shake correction lens at a position where the determination for the camera-shake correction was performed regardless of exposure processing.

Accordingly, the camera-shake correction apparatus can reduce a fluctuation of an image on the image sensor, which may occur when the camera-shake correction operation is performed on the low-frequency drift signal (fluctuation) output from the camera-shake detection sensor. Further, the camera-shake correction apparatus can prevent the angle of view from abruptly changing in the transition from the lens holding state to the normal image stabilization mode.

In the above-described first exemplary embodiment, the camera-shake correction apparatus sets the lens target position storage flag in the control interrupt performed immediately after the transition to the tripod mode and stores the latest lens target position (see step S113).

However, the above-described timing is not limited to the control interrupt performed immediately after the transition to the tripod mode. For example, the above-described timing can be a depression of the first switch (SW1) or the second switch (SW2) of the operation unit 117 after the transition to the tripod mode. Namely, the camera-shake correction apparatus can set the lens target position storage flag when the switch SW1 or the switch SW2 is pressed after the transition to the tripod mode. Then, the camera-shake correction apparatus can store the lens target position.

Figure 6:
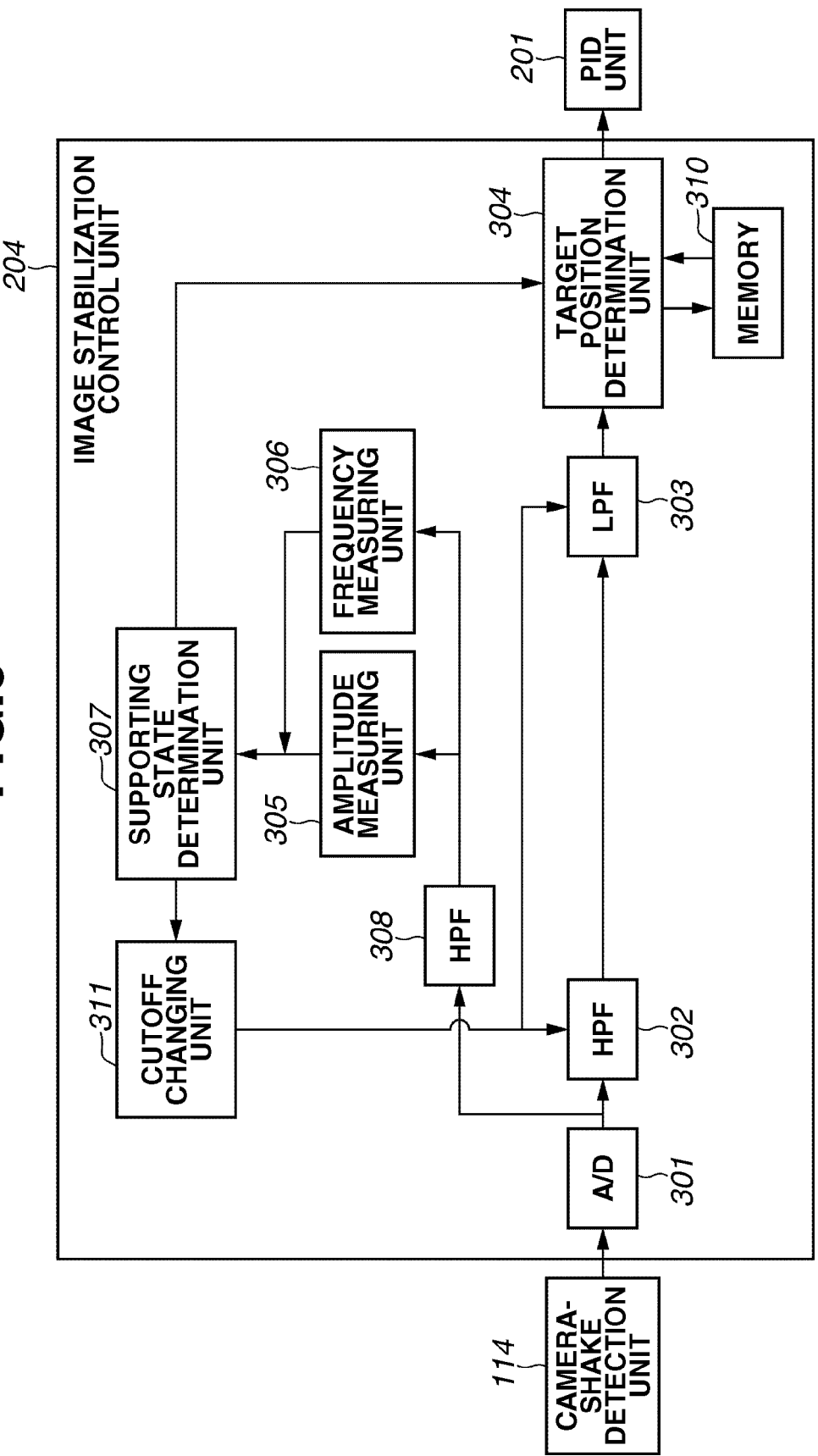
FIG. 6 is a block diagram illustrating an example of a control unit according to a second exemplary embodiment of the present invention.
Figure 7B:
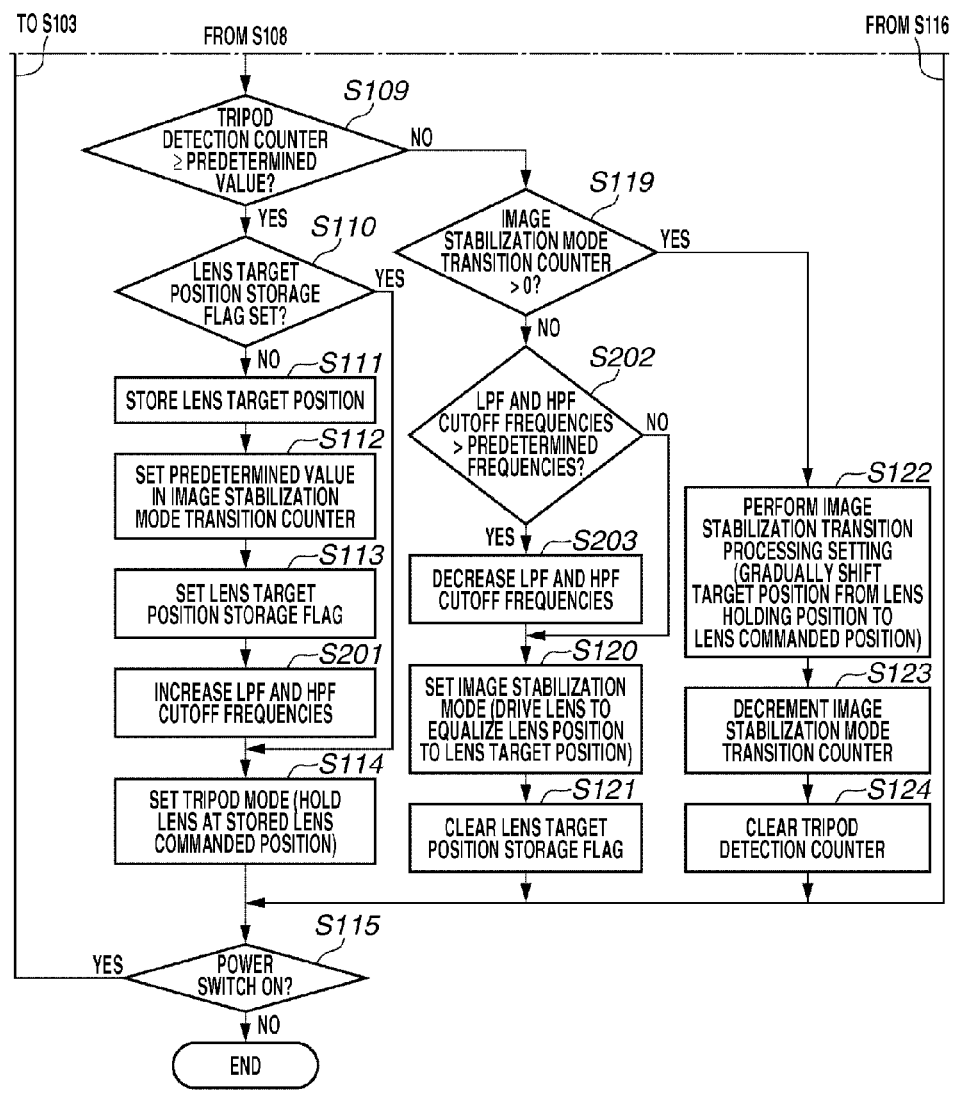
FIGS. 7 (7A and 7B) is a flowchart illustrating an example of an image stabilization control according to the second exemplary embodiment of the present invention.
Figure 8A:
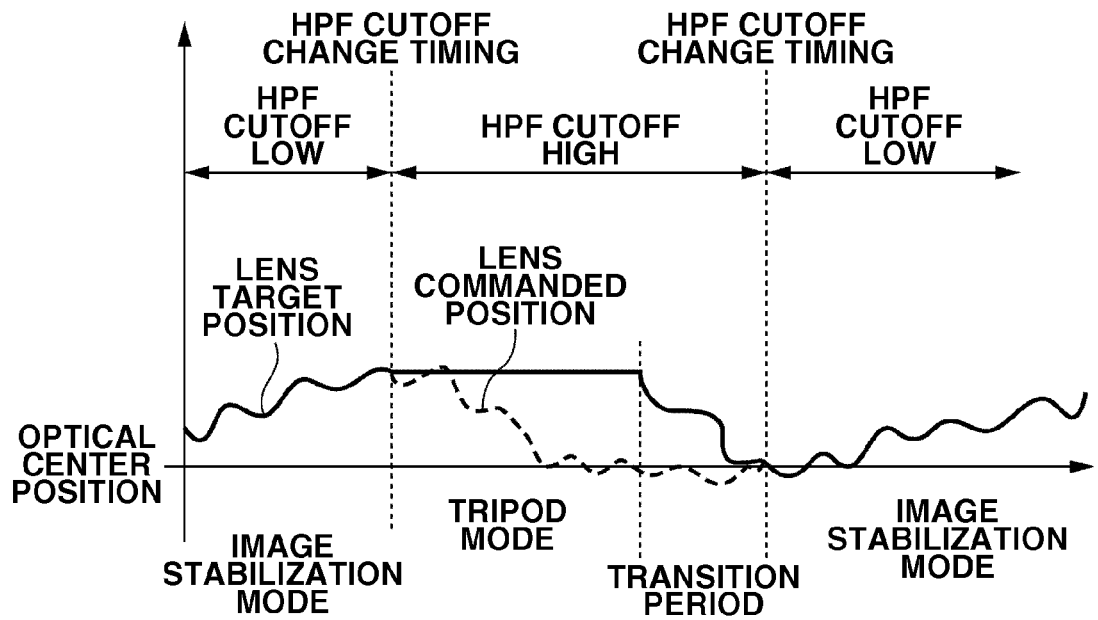
FIGS. 8A and 8B illustrate examples of the correction position control signal according to the second exemplary embodiment of the present invention.
Figure 8B:
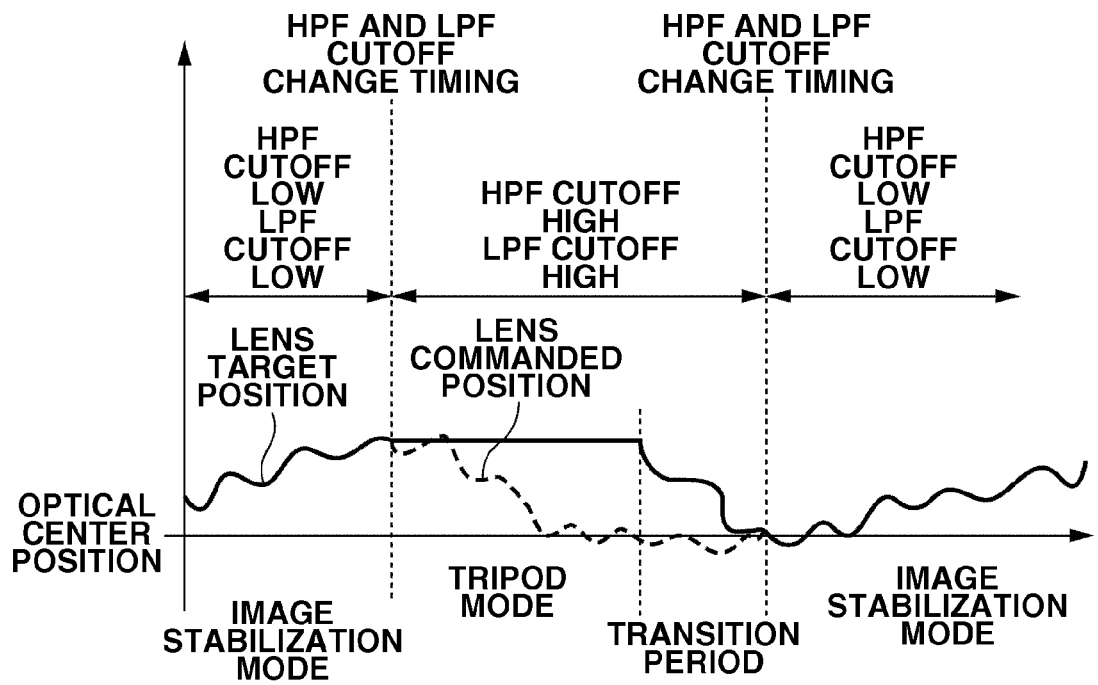

Next, a second exemplary embodiment of the present invention is described below. FIG. 6 is a block diagram illustrating an example of a control unit according to the second exemplary embodiment of the present invention. FIGS. 7 (7A, 7B) is a flowchart illustrating an example of an image stabilization control according to the second exemplary embodiment of the present invention. FIGS. 8A and 8B illustrate examples of the correction position control signal according to the second exemplary embodiment of the present invention.

The configuration of the second exemplary embodiment is basically similar to the configuration of the first exemplary embodiment. Therefore, the configuration of the first exemplary embodiment can be referred to as part of the second exemplary embodiment. Hereinafter, only the portions not described in the first exemplary embodiment are described below.

The block diagram illustrated in FIG. 6 is different from the configuration illustrated in FIG. 3 (i.e., the block diagram of the control unit 204 according to the first exemplary embodiment) in that a cutoff changing unit 311 is added. The cutoff changing unit 311 can receive information from the supporting state determination unit 307 and can change cutoff frequencies of the HPF 302 and the LPF 303 that calculate camera-shake correction command values based on a camera-shake detection signal. In the present exemplary embodiment, the cutoff frequencies of the HPF 302 and the LPF 303 are both changeable. However, similar effects may be obtained even when only one of the cutoff frequencies of the HPF 302 and the LPF 303 is changeable. In the present exemplary embodiment, the cutoff frequencies of the HPF 302 and the LPF 303 are changeable. However, instead of the LPF 303, if an integration circuit with a variable time constant is used, the time constant may be changed. In this case, if it is determined that the imaging apparatus is fixed to a tripod, the time constant of the integration circuit may be decreased.

An example of processing that can be performed by the control unit 204 according to the present exemplary embodiment is described below with reference to the flowchart illustrated in FIG. 7.

Processing to be performed in steps S101 to S109 according to the present exemplary embodiment is similar to the corresponding processing described in the first exemplary embodiment. Then, in step S110, the operation mode shifts to the tripod mode. The supporting state determination unit 307 confirms the lens target position storage flag. If it is determined that the lens target position storage flag is not set (NO in step S110), then in step S111, the supporting state determination unit 307 stores the lens target position.

In step S112, the supporting state determination unit 307 sets a predetermined value in the image stabilization mode transition counter. The image stabilization mode transition counter is used to measure an elapsed time after the transition from the tripod mode to the image stabilization mode is instructed. Further, during the setting time of the image stabilization mode transition counter, the lens target position is gradually changed from the lens holding position to a lens command position. Thus, the lens target position can be smoothly changed. In other words, the above-described operation can prevent the angle of view from abruptly changing due to the mode change.

In step 113, the supporting state determination unit 307 sets the lens target position storage flag. Then, in step S201, the supporting state determination unit 307 performs tripod mode setting. In step S201, the cutoff changing unit 311 changes the specific frequency component (increases the cutoff frequencies) of the HPF 302 and the LPF 303 to a higher-frequency side in a transition from the tripod mode to the image stabilization mode, so that the lens can start an image stabilization operation from a position adjacent to the center. Then, in step S114, the target position determination unit 304 sets the stored lens target position as a target position of the camera-shake correction lens.

As described above, while the camera-shake correction lens position is stationarily held during the tripod mode setting, the low-frequency component can be removed from the image stabilization target position by increasing the cutoff frequencies of the HPF 302 and the LPF 303. Accordingly, the calculated lens target position becomes a signal including only the high-frequency camera-shake component in the vicinity of the optical center of the lens.

On the other hand, if it is determined that a value having been set as the tripod detection counter value is smaller than the predetermined counter value for the tripod detection (NO in step S109), the camera-shake correction apparatus shifts the operation mode from the tripod mode to the image stabilization mode. First, in step S119, it is determined whether the image stabilization mode transition counter is greater than zero. If it is determined that the image stabilization mode transition counter is greater than zero (YES in step S119), the lens position is different from the lens target position.

Therefore, in step S122, the camera-shake correction apparatus drives the lens so that the lens position may be equalized with the lens target position by gradually reducing the distance between the lens holding position in the tripod mode and the lens target position that is closer to a lens optical center. After the lens position is equalized with the lens target position, the image stabilization mode transition counter becomes zero.

In step S202, the cutoff changing unit 311 determines whether the cutoff frequencies of the HPF 302 and the LPF 303 are higher than predetermined frequencies. In the present exemplary embodiment, the predetermined frequencies are, for example, normal cutoff frequencies at which the filters can realize the highest image stabilization performance. If in step S109 it is determined that the tripod detection counter is smaller than the predetermined value (NO in step S109), the cutoff frequencies of the HPF 302 and the LPF 303 are higher than the predetermined frequencies (YES in step S202) because of the processing in step 201 performed in the tripod mode. Therefore, the processing proceeds to step S203.

In step 203, the cutoff changing unit 311 gradually decreases the cutoff frequencies of the HPF 302 and the LPF 303 to the lower frequency side until the cutoff frequencies, which have been once changed to the higher frequency side in the tripod mode, decrease to the predetermined frequencies. Then, the processing proceeds to step S120, the camera-shake correction apparatus starts image stabilization mode setting. After the cutoff frequencies are changed by the cutoff changing unit 311 in step 203 and the cutoff frequencies become equal to the predetermined frequencies, the processing directly proceeds to step S120.

In step S121, to continuously perform the image stabilization function in the normal image stabilization mode until the condition of the tripod mode is satisfied again, the supporting state determination unit 307 clears the lens target position storage flag for the next transition to the tripod mode. Then, the processing proceeds to step S115 to perform the normal image stabilization mode setting.

Through the above-described processing, as indicated by waveform examples in FIGS. 8A and 8B, the low-frequency component can be removed by increasing the cutoff frequencies of the filters in the tripod mode. The camera-shake correction lens target position can smoothly shift after the lens target position has returned to a position adjacent to the optical center of the lens. Accordingly, the image stabilization operation to be performed after the tripod mode can be started from a position adjacent to the center of the lens driving range. The camera-shake correction apparatus can prevent the lens target position from approaching the edge of the lens driving range.

Figure 9:
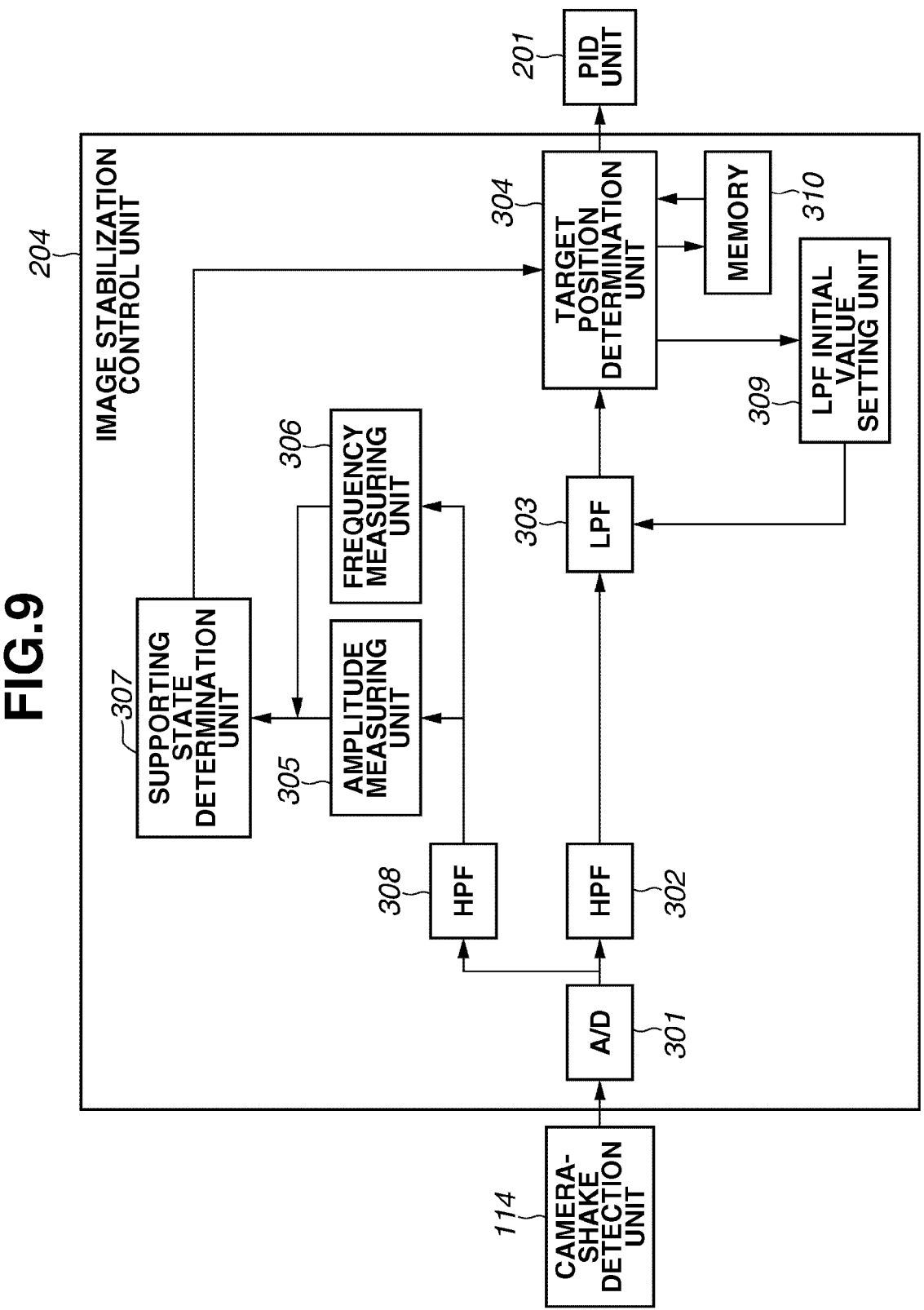
FIG. 9 is a block diagram illustrating an example of a control unit according to a third exemplary embodiment of the present invention.
Figure 11:
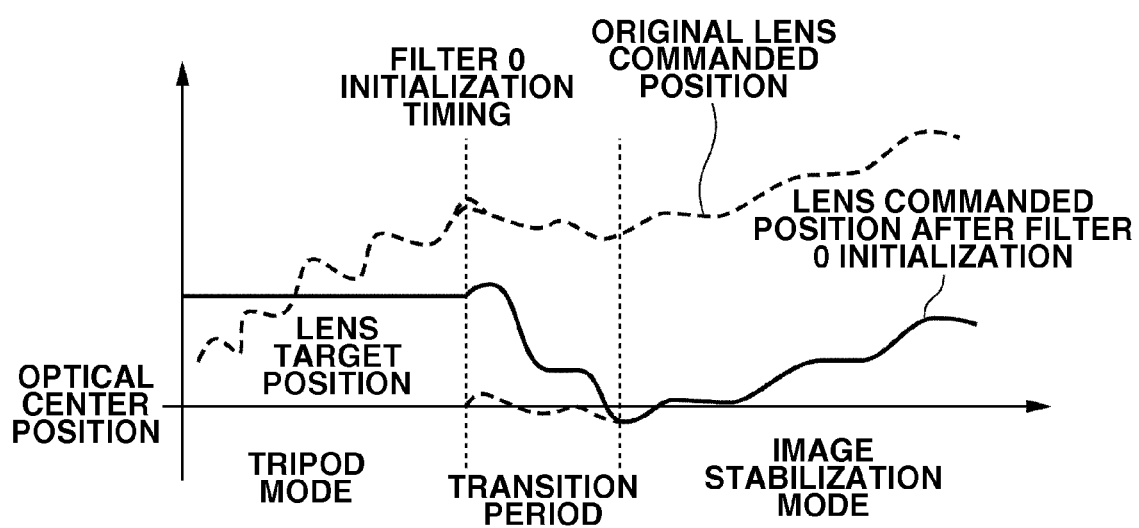
FIG. 11 illustrates examples of the correction position control signal according to the third exemplary embodiment of the present invention.

Next, a third exemplary embodiment of the present invention is described below. FIG. 9 is a block diagram illustrating an example of a control unit according to the third exemplary embodiment of the present invention. FIG. 10 is a flowchart illustrating an example of an image stabilization control according to the third exemplary embodiment of the present invention. FIG. 11 illustrates examples of the correction position control signal according to the third exemplary embodiment of the present invention.

The configuration of the third exemplary embodiment is basically similar to the configuration of the first exemplary embodiment. Therefore, the configuration of the first exemplary embodiment can be referred to as part of the third exemplary embodiment. Hereinafter, only the portions not described in the first exemplary embodiment are described below.

In the present exemplary embodiment, the block diagram illustrated in FIG. 9 is different from the configuration illustrated in FIG. 3 (i.e., the block diagram of the control unit 204 according to the first exemplary embodiment) in that an LPF initial value setting unit 309 is added. The LPF initial value setting unit 309 is configured to set an initial calculation value of the LPF 303 for calculation of the lens target position based on the output of the target position determination unit 304.

An example of processing that is performed by the control unit 204 according to the present exemplary embodiment is described below with reference to the flowchart illustrated in FIG. 10. Processing to be performed in steps S101 to S109 according to the present exemplary embodiment is similar to the corresponding processing described in the first exemplary embodiment. Then, in step S110, the operation mode shifts to the tripod mode. The supporting state determination unit 307 confirms the lens target position storage flag. If it is determined that the lens target position storage flag is not set (NO in step S110), then in step S111, the supporting state determination unit 307 stores the lens target position.

In step S112, the supporting state determination unit 307 sets a predetermined value in the image stabilization mode transition counter. In step S113, the supporting state determination unit 307 sets the lens target position storage flag. Then, in step S301, the supporting state determination unit 307 sets a lens target position initialization flag. Then, in step S114, the supporting state determination unit 307 sets the stored lens target position as a target position of the camera-shake correction lens.

On the other hand, if it is determined that the value having been set as the tripod detection counter value is smaller than the predetermined counter value for the tripod detection (NO in step S109), the processing proceeds to step 119. In step 119, it is determined whether the image stabilization mode transition counter is greater than zero. If it is determined that the image stabilization mode transition counter is greater than zero (YES in step S119), then in step S302, the supporting state determination unit 307 determines whether the lens target position initialization flag is set.

Then, if it is determined that the lens target position initialization flag is set (YES in step S302), then in step S303, the LPF initial value setting unit 309 clears an LPF initial value that can be used to calculate the lens target position (i.e., LPF initial value=zero). Accordingly, calculation of the lens target position starts again from the optical center of the lens.

In step S304, i.e., after the LPF initial value is clear (i.e., LPF initial value=zero), the supporting state determination unit 307 sets the lens target position initialization flag to prevent the LPF initial value from being cleared again in the next interrupt processing. Then, in step S122, the camera-shake correction apparatus gradually shifts the lens from the lens holding position according to the tripod mode to the lens target position where the calculation is again started in the vicinity of the lens optical center. And, the camera-shake correction apparatus starts image stabilization processing.

If the supporting state determination unit 307 does not confirm that the lens target position initialization flag is set (NO in step S302), the processing proceeds to step S122.

Through the above-described processing, as illustrated by a waveform example in FIG. 11, the camera-shake correction apparatus can start the image stabilization operation to be performed after the tripod mode from a position adjacent to the center of the lens driving range by clearing the LPF initial value (=0) at timing immediately after the transition from the tripod mode to the image stabilization mode. Therefore, similar to the second exemplary embodiment, the camera-shake correction apparatus can prevent the lens target position from approaching the edge of the lens driving range.

The present exemplary embodiment is different from the above-described first to third exemplary embodiments in that the supporting state determination is performed based on only the amplitude of the camera-shake applied to the imaging apparatus. The imaging apparatus according to the present exemplary embodiment is similar to the imaging apparatus illustrated in FIG. 3, FIG. 6, or FIG. 9 except that the frequency measuring unit 306 is not provided or not used.

Figure 4B:
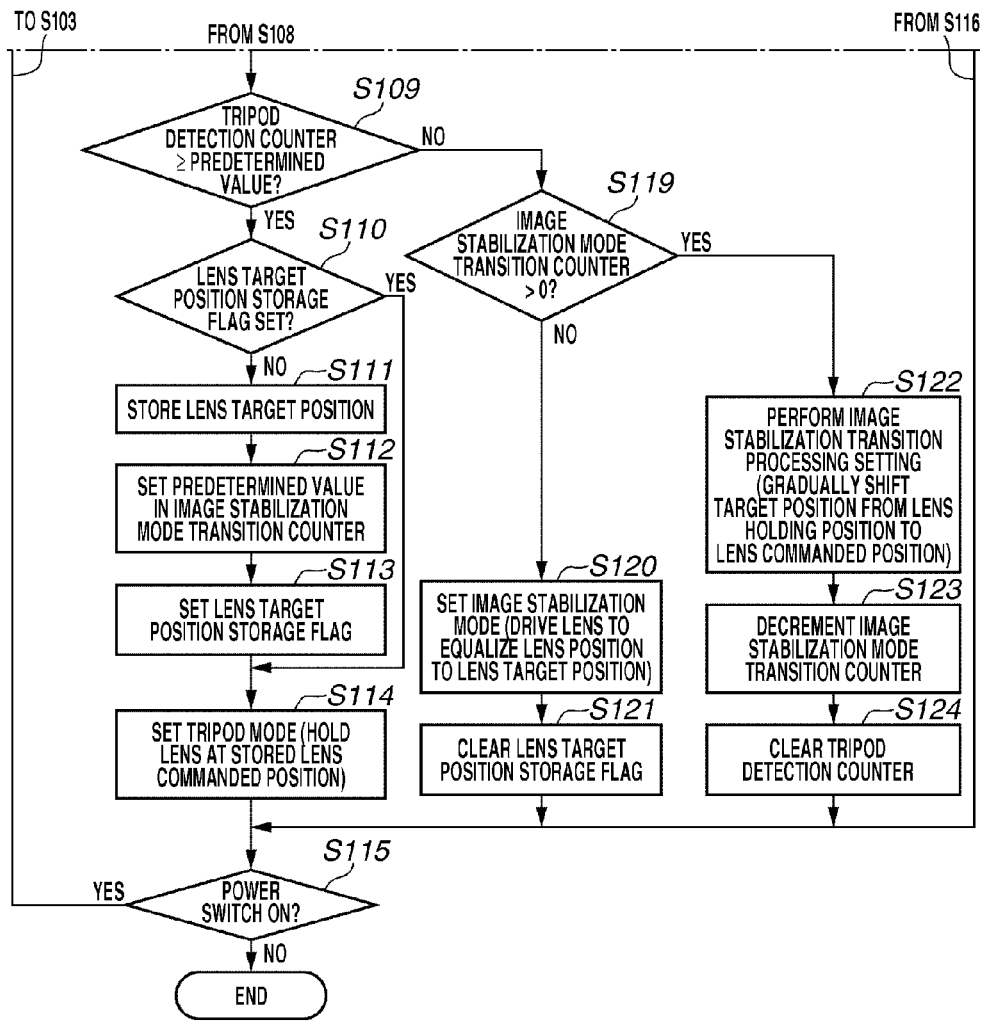
FIGS. 4 (4A and 4B) is a flowchart illustrating an example of an image stabilization control according to the first exemplary embodiment of the present invention.
Figure 12:
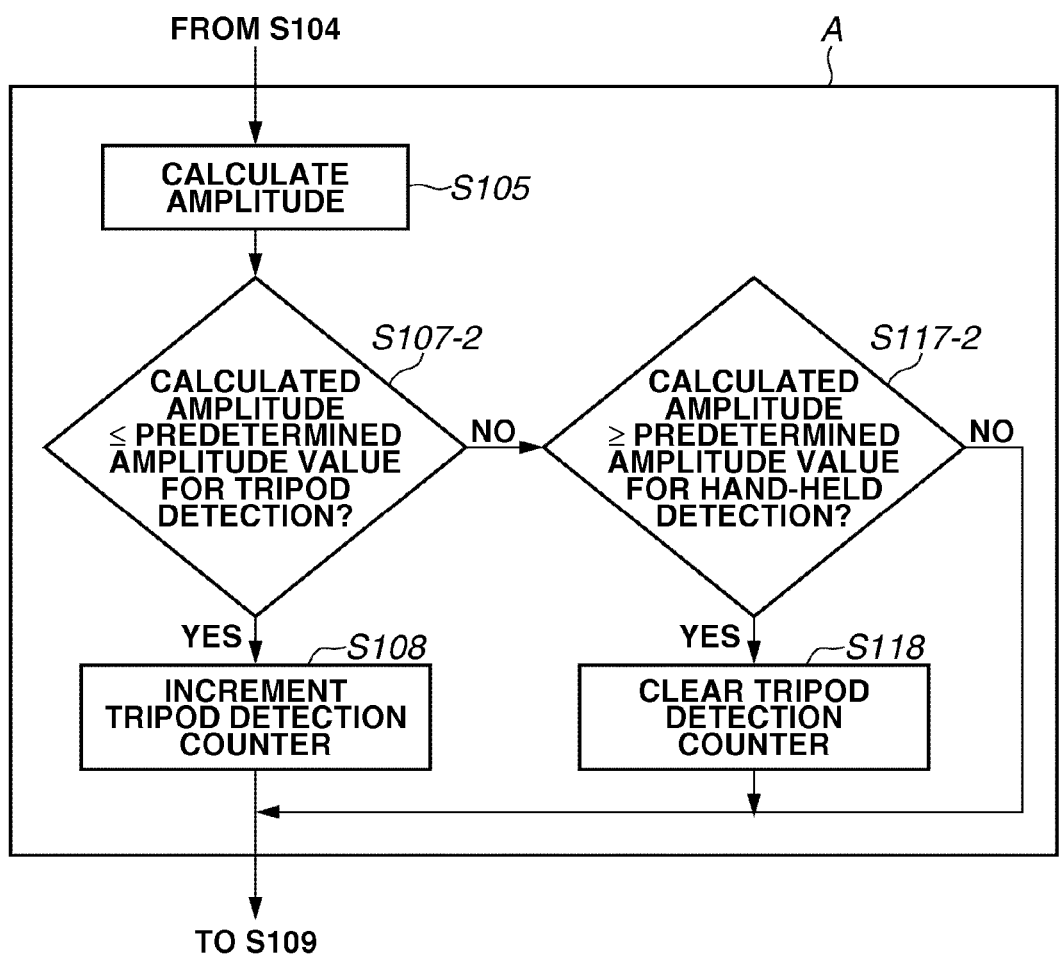
FIG. 12 is a flowchart illustrating an example of an image stabilization control according to a fourth exemplary embodiment of the present invention.

FIG. 12 is a partial flowchart corresponding to a portion "A" illustrated in FIG. 4A, FIG. 7A, or FIG. 10A. In the present exemplary embodiment, only the steps relating to the modified portion "A" are described because the rest of the flowchart is similar to that described in the first to third exemplary embodiments illustrated in FIGS. 4 (4A, 4B), FIGS. 7 (7A, 7B), or FIGS. 10 (10A, 10B) and the description for other steps is not repeated in the following description.

If in step S104 it is determined that the camera-shake correction function is ON, the processing proceeds to S105. In step S105, the amplitude measuring unit 305 calculates the amplitude of the camera-shake signal that represents the camera-shake amount applied to the imaging apparatus. In this calculation, the amplitude measuring unit 305 uses the signal obtained by the HPF 308 that removes the DC component from the A/D converted camera-shake signal.

Next, in step S107-2, the supporting state determination unit 307 compares the calculated amplitude with the predetermined amplitude value for the tripod detection. In the present exemplary embodiment, the predetermined amplitude value for the tripod detection is a threshold for detecting a state where the imaging apparatus is attached to the tripod. If it is determined that the calculated amplitude is equal to or smaller than the predetermined amplitude value for the tripod detection (YES in step S107-2), the processing proceeds to step S108. Then, in step S108, the supporting state determination unit 307 increments the tripod detection counter. Then, the processing proceeds to step S109.

On the other hand, if it is determined that the amplitude calculated by the supporting state determination unit 307 is greater than the predetermined amplitude value for the tripod detection (NO in step S107-2), the processing proceeds to step S117-2.

In step S117-2, the supporting state determination unit 307 determines whether the imaging apparatus is in the hand-held state, using the threshold for the hand-held detection that is independent of the threshold for the tripod detection. More specifically, the supporting state determination unit 307 compares the calculated amplitude with the predetermined amplitude value for the hand-held detection. If it is determined that the calculated amplitude equal to or greater than the predetermined amplitude value for the hand-held detection (YES in step S117-2), the processing proceeds to step S118.

Then, in step S118, the supporting state determination unit 307 clears the tripod detection counter. Then, the processing proceeds to step S109. On the other hand, if it is determined that the amplitude calculated in step S117-2 is smaller than the predetermined amplitude value for the hand-held detection (NO in step S117-2), the processing directly proceeds to step S109.

Through the above-described processing, the present exemplary embodiment can execute the processing similar to that described in the first to third exemplary embodiments by determining the supporting state based on only the amplitude of the camera-shake applied to the imaging apparatus.

The present exemplary embodiment is different from the above-described first to third exemplary embodiments in that the supporting state determination is performed based on only the frequency of the camera-shake applied to the imaging apparatus. The imaging apparatus according to the present exemplary embodiment is similar to the imaging apparatus illustrated in FIG. 3, FIG. 6, or FIG. 9 except that the amplitude measuring unit 305 is not provided or not used.

Figure 13:
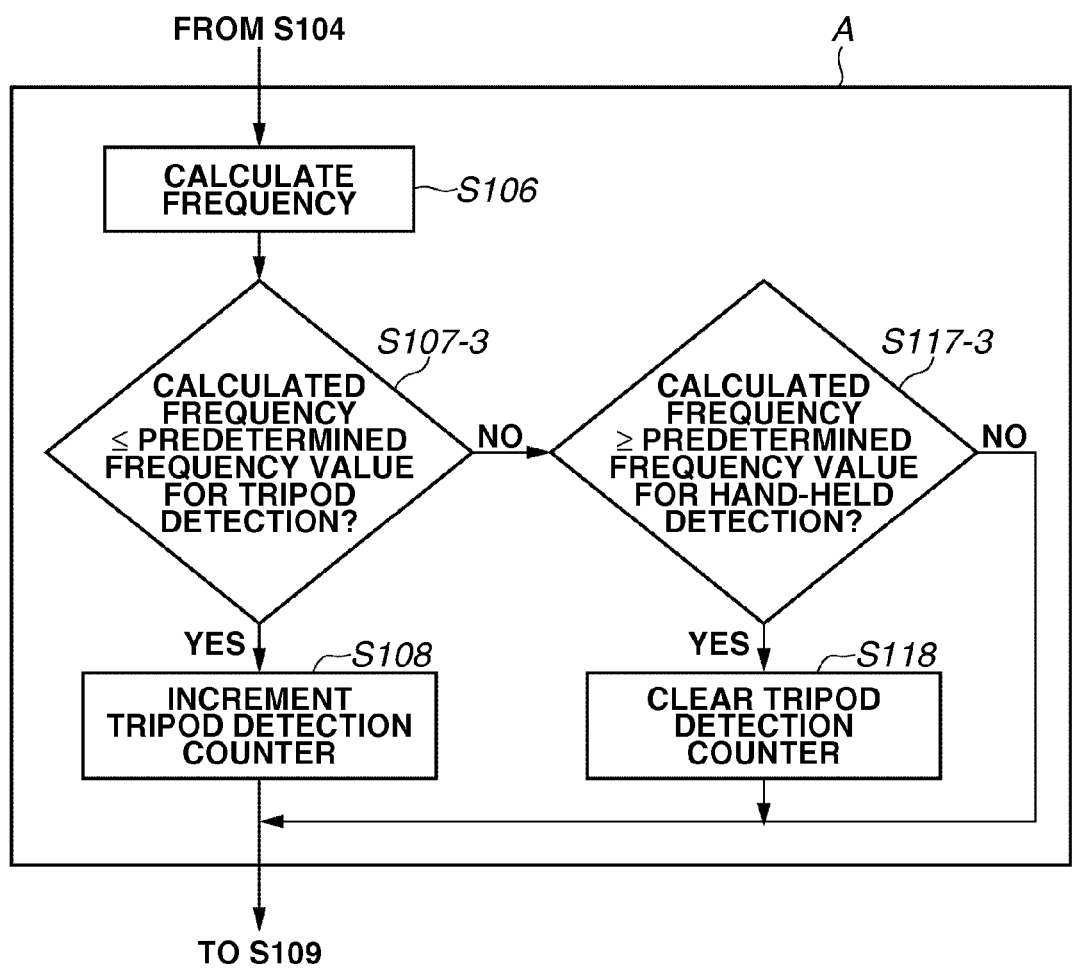
FIG. 13 is a flowchart illustrating an example of an image stabilization control according to a fifth exemplary embodiment of the present invention.

FIG. 13 is a partial flowchart corresponding to the portion "A" illustrated in FIG. 4A, FIG. 7A, or FIG. 10A. In the present exemplary embodiment, only the steps relating to the modified portion "A" are described because the rest of the flowchart is similar to that described in the first to third exemplary embodiments illustrated in FIGS. 4 (4A, 4B), FIGS. 7 (4A, 4B), or FIGS. 10 (10A, 10B) and the description for other steps is not repeated in the following description.

If in step S104 it is determined that the camera-shake correction function is ON, the processing proceeds to S106. In step S106, the frequency measuring unit 306 calculates the frequency of the camera-shake signal that represents the camera-shake amount applied to the imaging apparatus. In this calculation, the frequency measuring unit 306 uses the signal obtained by the HPF 308 that removes the DC component from the A/D converted camera-shake signal.

Next, in step S107-3, the supporting state determination unit 307 compares the calculated frequency with the predetermined frequency value for the tripod detection. In the present exemplary embodiment, the predetermined frequency value for the tripod detection is the threshold for detecting the state where the imaging apparatus is attached to the tripod.

If it is determined that the calculated frequency is equal to or lower than the predetermined frequency value for the tripod detection (YES in step S107-3), the processing proceeds to step S108. Then, in step S108, the supporting state determination unit 307 increments the tripod detection counter. Then, the processing proceeds to step S109. On the other hand, if it is determined that the frequency calculated by the supporting state determination unit 307 is higher than the predetermined frequency value for the tripod detection (NO in step S107-3), the processing proceeds to step S117-3.

In step S117-3, the supporting state determination unit 307 determines whether the imaging apparatus is in the hand-held state, using the threshold for the hand-held detection that is independent of the threshold for the tripod detection. More specifically, the supporting state determination unit 307 compares the calculated frequency with the predetermined frequency value for the hand-held detection. If it is determined that the calculated frequency is equal to or higher than the predetermined frequency value for the hand-held detection (YES in step S117-3), the processing proceeds to step S118.

Then, in step S118, the supporting state determination unit 307 clears the tripod detection counter. Then, the processing proceeds to step S109. On the other hand, if it is determined that the frequency calculated in step S117-3 is lower than the predetermined frequency value for the hand-held detection (NO in step S117-3), the processing directly proceeds to step S109.

Through the above-described processing, the present exemplary embodiment can execute the processing similar to that described in the first to third exemplary embodiments by determining the supporting state based on only the frequency of the camera-shake applied to the imaging apparatus.

It should be noted that the present invention can be applied, for example, to a digital single-lens reflex camera, a digital video camera, a digital still camera, a camera-equipped portable terminal, a telescope, and a binocular.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-304596 filed Nov. 28, 2008 and No.

2009-250644 filed Oct. 30, 2009, which are hereby incorporated by reference herein in their entirety.

What is claimed is:

1. An image-blur correction apparatus comprising:
    an image capturing unit configured to capture an object image;
    a camera-shake detection unit configured to detect a camera-shake applied to the image-blur correction apparatus;
    a target position determination unit configured to determine a correction target position of a correction member based on a camera-shake signal detected by the camera-shake detection unit;
    a correction unit configured to correct the camera-shake of the object image by moving the correction member to the correction target position;
    a measuring unit configured to measure an amplitude of the camera-shake or a frequency of the camera-shake based on the camera-shake signal supplied from the camera-shake detection unit;
    a memory configured to store a correction target position determined by the target position determination unit when it is first determined that the measured amplitude is less than a predetermined amplitude or when it is first determined that the measured frequency is less than a predetermined frequency; and
    a control unit configured to hold the correction member at the stored correction target position until it is determined that the measured amplitude is greater than a second amplitude or the measured frequency is greater than a second frequency.

2. The image-blur correction apparatus according to claim 1, wherein the control unit performs a camera-shake correction based on the camera-shake signal if it is determined that the measured amplitude of the camera-shake is greater than the second amplitude or if it is determined that the measured frequency of the camera-shake is greater than the second frequency.

3. The image-blur correction apparatus according to claim 2, further comprising a present position detection unit configured to detect a present position of the correction member,
    wherein the control unit gradually moves the correction member from the present position to the correction target position in a transition from a state where the correction member is stationarily held to a state where the camera-shake correction is performed.

4. The image-blur correction apparatus according to claim 1, further comprising a filter unit configured to cut a specific frequency component included in an output from the camera-shake detection unit,
    wherein the control unit changes the specific frequency component by the filter unit such that the frequency increases if it is determined that the measured amplitude is less than the predetermined amplitude or if it is determined that the measured frequency is less than the predetermined frequency.

5. The image-blur correction apparatus according to claim 4, wherein the control unit changes the specific frequency component by the filter unit such that the frequency decreases after the correction member has reached the target position.

6. The image-blur correction apparatus according to claim 2, further comprising a present position detection unit configured to detect a present position of the correction unit,
    wherein the control unit initializes the correction target position and gradually moves the correction member from the present position to the correction target position if it is determined that the measured amplitude is greater than the second amplitude and the measured frequency is greater than the second frequency.

7. The image-blur correction apparatus according to claim 6, further comprising a filter unit configured to cut a specific frequency component included in an output from the camera-shake detection unit,
    wherein the control unit changes the specific frequency component by the filter unit such that the frequency increases if it is determined that the measured amplitude is less than the predetermined amplitude or if it is determined that the measured frequency is less than the predetermined frequency.

8. The image-blur correction apparatus according to claim 7, wherein the control unit changes the specific frequency component by the filter unit such that the frequency decreases after the correction member has reached the target position.

9. An imaging apparatus including an image-blur correction apparatus, the image-blur correction apparatus comprising:
    an image capturing unit configured to capture an object image;
    a camera-shake detection unit configured to detect a camera-shake applied to the image-blur correction apparatus;
    a target position determination unit configured to determine a correction target position of a correction member based on a camera-shake signal detected by the camera-shake detection unit;
    a correction unit configured to correct the camera-shake of the object image by moving the correction member in a direction perpendicular to an optical axis to the correction target position;
    a measuring unit configured to measure an amplitude of the camera-shake or a frequency of the camera-shake based on the camera-shake signal supplied from the camera-shake detection unit;
    a memory configured to store a correction target position determined by the target position determination unit when it is first determined that the measured amplitude is less than a predetermined amplitude or when it is first determined that the measured frequency is less than a predetermined frequency; and
    a control unit configured to hold the correction member at the stored correction target position until it is determined that the measured amplitude is greater than a second amplitude or the measured frequency is greater than a second frequency.

10. An image-blur correction apparatus comprising:
    an image capturing unit configured to capture an object image;
    a camera-shake detection unit configured to detect a camera-shake applied to the image-blur correction apparatus;
    a target position determination unit configured to determine a correction target position of a correction member based on a camera-shake signal detected by the camera-shake detection unit;
    a correction unit configured to correct the camera-shake of the object image by moving the correction member in a direction perpendicular to an optical axis to the correction target position;
    an amplitude measuring unit configured to measure an amplitude of the camera-shake based on the camera-shake signal supplied from the camera-shake detection unit;

a frequency measuring unit configured to measure a frequency of the camera-shake based on the camera-shake signal supplied from the camera-shake detection unit;

a memory configured to store a correction target position determined by the target position determination unit when it is first determined that the measured amplitude is less than a predetermined amplitude and the measured frequency is less than a predetermined frequency; and a control unit configured to hold the correction member at the stored correction target position until it is determined that the measured amplitude is greater than a second amplitude or the measured frequency is greater than a second frequency.

11. The image-blur correction apparatus according to claim 10, wherein the control unit performs a camera-shake correction based on the output of the camera-shake detection unit if it is determined that the measured amplitude of the camera-shake is greater than the second amplitude or if it is determined that the measured frequency of the camera-shake is greater than the second frequency.

12. The image-blur correction apparatus according to claim 11, further comprising:

a present position detection unit configured to detect a present position of the correction member, wherein the control unit gradually moves the correction member from the present position to the correction target position in a transition from a state where the correction member is stationarily held to a state where the camera-shake correction is performed.

13. The image-blur correction apparatus according to claim 10, further comprising a filter unit configured to cut a specific frequency component included in an output from the camera-shake detection unit, wherein the control unit changes the specific frequency component by the filter unit such that the frequency increases if it is determined that the measured amplitude is less than the predetermined amplitude and if it is determined that the measured frequency is less than the predetermined frequency.

14. The image-blur correction apparatus according to claim 13, wherein the control unit changes the specific frequency component by the filter unit such that the frequency increases decreases after the correction member has reached the target position.

15. The image-blur correction apparatus according to claim 11, further comprising:

a present position detection unit configured to detect a present position of the correction unit; and a target position determination unit configured to determine a correction target position of the correction unit, wherein the control unit initializes the correction target position and gradually moves the correction member to the correction target position if it is determined that the measured amplitude is greater than the second amplitude and the measured frequency is greater than the second frequency.

16. The image-blur correction apparatus according to claim 15, further comprising a filter unit configured to cut a specific frequency component included in an output from the camera-shake detection unit, wherein the control unit changes the specific frequency component by the filter unit such that the frequency increases if it is determined that the measured amplitude is less than the predetermined amplitude and if it is determined that the measured frequency is less than the predetermined frequency.

17. The image-blur correction apparatus according to claim 16, wherein the control unit changes the specific frequency component by the filter unit such that the frequency decreases after the correction member has reached the target position.

18. An imaging apparatus including an image-blur correction apparatus, the image-blur correction apparatus comprising:

an image capturing unit configured to capture an object image;

a camera-shake detection unit configured to detect a camera-shake applied to the image-blur correction apparatus;

a target position determination unit configured to determine a correction target position of a correction member based on a camera-shake signal detected by the camera-shake detection unit;

a correction unit configured to correct the camera-shake of the object image by moving the correction member in a direction perpendicular to an optical axis to the correction target position;

an amplitude measuring unit configured to measure an amplitude of the camera-shake based on the camera-shake signal supplied from the camera-shake detection unit;

a frequency measuring unit configured to measure a frequency of the camera-shake based on the camera-shake signal supplied from the camera-shake detection unit;

a memory configured to store a correction target position determined by the target position determination unit when it is first determined that the measured amplitude is less than a predetermined amplitude and the measured frequency is less than a predetermined frequency; and a control unit configured to hold the correction member at the stored correction target position until it is determined that the measured amplitude is greater than a second amplitude or the measured frequency is greater than a second frequency.

* * * * *